US011616679B2

(12) United States Patent
Newman et al.

(10) Patent No.: US 11,616,679 B2
(45) Date of Patent: *Mar. 28, 2023

(54) DETECTION AND MITIGATION OF 5G/6G MESSAGE FAULTS

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(73) Assignee: ULTRALOGIC 6G, LLC, Palos Verdes, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/901,314

(22) Filed: Sep. 1, 2022

(65) Prior Publication Data
US 2023/0006875 A1    Jan. 5, 2023

Related U.S. Application Data

(63) Continuation of application No. 17/675,198, filed on Feb. 18, 2022, now Pat. No. 11,456,821.
(Continued)

(51) Int. Cl.
*H04W 28/04* (2009.01)
*H04L 27/26* (2006.01)
(Continued)

(52) U.S. Cl.
CPC ........ *H04L 27/2691* (2013.01); *H04L 1/0003* (2013.01); *H04L 1/0019* (2013.01); *H04L 1/0045* (2013.01); *H04L 1/0047* (2013.01); *H04L 1/0061* (2013.01); *H04L 1/08* (2013.01); *H04L 1/1607* (2013.01); *H04L 1/1809* (2013.01); *H04L 1/20* (2013.01); *H04L 1/201* (2013.01); *H04L 1/206* (2013.01);
(Continued)

(58) Field of Classification Search
CPC ................................ H04W 28/04; H04L 1/20
USPC ......................................................... 370/329
See application file for complete search history.

(56) References Cited

U.S. PATENT DOCUMENTS

2007/0089036 A1    4/2007   Jiang
2007/0089037 A1    4/2007   Jiang
(Continued)

*Primary Examiner* — Angel T Brockman
(74) *Attorney, Agent, or Firm* — Mayer & Williams, PC

(57) ABSTRACT

In current practice, faulted messages are typically discarded and a retransmission is requested. Forward error-correction codes (FEC) in 5G and 6G are bulky, resource-expensive, and often unable to resolve the problem. Disclosed are systems and methods for determining which specific message elements are faulted, so that just the faulted portion can be retransmitted, instead of the entire message. For example, the amplitudes of the I and Q branches, of each message element, can be compared to the calibrated amplitude levels of the modulation scheme. Any message element with a large amplitude deviation is suspect. Other factors, such as the SNR, can also be considered in evaluating the validity of each message element. Usually, all of the faulted message elements occupy just a portion of the message. Compact formats are disclosed specifying which portion of the message is to be retransmitted, thereby saving time, power, and background generation.

20 Claims, 15 Drawing Sheets

Related U.S. Application Data

(60) Provisional application No. 63/310,240, filed on Feb. 15, 2022, provisional application No. 63/310,364, filed on Feb. 15, 2022, provisional application No. 63/309,748, filed on Feb. 14, 2022, provisional application No. 63/309,750, filed on Feb. 14, 2022, provisional application No. 63/282,770, filed on Nov. 24, 2021, provisional application No. 63/281,847, filed on Nov. 22, 2021, provisional application No. 63/281,187, filed on Nov. 19, 2021, provisional application No. 63/280,281, filed on Nov. 17, 2021, provisional application No. 63/230,926, filed on Aug. 9, 2021, provisional application No. 63/159,238, filed on Mar. 10, 2021, provisional application No. 63/159,195, filed on Mar. 10, 2021, provisional application No. 63/157,090, filed on Mar. 5, 2021, provisional application No. 63/151,270, filed on Feb. 19, 2021.

(51) Int. Cl.

| | | |
|---|---|---|
| *H04L 1/00* | (2006.01) | |
| *H04L 1/08* | (2006.01) | |
| *H04L 1/20* | (2006.01) | |
| *H04L 27/02* | (2006.01) | |
| *H04L 27/34* | (2006.01) | |
| *H04L 1/1607* | (2023.01) | |
| *H04L 1/1809* | (2023.01) | |
| *H04L 27/36* | (2006.01) | |

(52) U.S. Cl.
CPC .......... *H04L 27/02* (2013.01); *H04L 27/2614* (2013.01); *H04L 27/34* (2013.01); *H04L 27/364* (2013.01); *H04W 28/04* (2013.01)

(56) References Cited

U.S. PATENT DOCUMENTS

| | | |
|---|---|---|
| 2009/0046771 A1 | 2/2009 | Abe |
| 2010/0097939 A1 | 4/2010 | Yoneta |
| 2012/0311409 A1 | 12/2012 | Pedersen |
| 2013/0163656 A1 | 6/2013 | Sakamoto |
| 2013/0346826 A1 | 12/2013 | Zopf |
| 2014/0376358 A1 | 12/2014 | Eder |
| 2015/0139350 A1 | 5/2015 | Sugihara |
| 2016/0080109 A1 | 3/2016 | Lee |
| 2017/0019210 A1 | 1/2017 | Yu |
| 2017/0134193 A1 | 5/2017 | Sugihara |
| 2017/0288912 A1 | 10/2017 | Rahmati |
| 2017/0311300 A1 | 10/2017 | Stanwood |
| 2017/0331734 A1 | 11/2017 | Cariou |
| 2020/0366409 A1 | 11/2020 | Xu |
| 2020/0394090 A1 | 12/2020 | Urban |
| 2021/0250049 A1 | 8/2021 | Gabrys |
| 2021/0273651 A1 | 9/2021 | Haftbaradaran |
| 2021/0328598 A1 | 10/2021 | Annamraju |
| 2021/0345169 A1 | 11/2021 | Wang |
| 2021/0383207 A1 | 12/2021 | Beery |
| 2022/0173836 A1* | 6/2022 | Newman .................. H04L 1/20 |

* cited by examiner

DETECTION AND MITIGATION OF 5G/6G MESSAGE FAULTS

PRIORITY CLAIMS AND RELATED APPLICATIONS

This application is a continuation of U.S. patent application Ser. No. 17/675,198, entitled "Retransmission of Selected PAM-Modulated Message Portions in 5G/6G", filed Feb. 18, 2022, which claims the benefit of U.S. Provisional Patent Application Ser. No. 63/151,270, entitled "Wireless Modulation for Mitigation of Noise and Interference", filed Feb. 19, 2021, and U.S. Provisional Patent Application Ser. No. 63/157,090, entitled "Asymmetric Modulation for High-Reliability 5G Communications", filed Mar. 5, 2021, and U.S. Provisional Patent Application Ser. No. 63/159,195, entitled "Asymmetric Modulation for High-Reliability 5G Communications", filed Mar. 10, 2021, and U.S. Provisional Patent Application Ser. No. 63/159,238, entitled "Selecting a Modulation Table to Mitigate 5G Message Faults", filed Mar. 10, 2021, and U.S. Provisional Patent Application Ser. No. 63/230,926, entitled "Error Detection and Correction in 5G by Modulation Quality", filed Aug. 9, 2021, and U.S. Provisional Patent Application Ser. No. 63/280,281, entitled "Error Detection and Correction in 5G by Modulation Quality in 5G/6G", filed Nov. 17, 2021, and U.S. Provisional Patent Application Ser. No. 63/281,187, entitled "Error Correction by Merging Copies of 5G/6G Messages", filed Nov. 19, 2021, and U.S. Provisional Patent Application Ser. No. 63/281,847, entitled "Retransmission of Selected Message Portions in 5G/6G", filed Nov. 22, 2021, and U.S. Provisional Patent Application Ser. No. 63/282,770, entitled "AI-Based Error Detection and Correction in 5G/6G Messaging", filed Nov. 24, 2021, and U.S. Provisional Patent Application Ser. No. 63/309,748, entitled "Error Detection and Correction in 5G/6G Pulse-Amplitude Modulation", filed Feb. 14, 2022, and U.S. Provisional Patent Application Ser. No. 63/309,750, entitled "Error Correction by Merging Copies of PAM-Modulated 5G/6G Messages", filed Feb. 14, 2022, and U.S. Provisional Patent Application Ser. No. 63/310,240, entitled "Retransmission of Selected PAM-Modulated Message Portions in 5G/6G", filed Feb. 15, 2022, and U.S. Provisional Patent Application Ser. No. 63/310,364, entitled "Artificial-Intelligence Error Mitigation in 5G/6G Messaging", filed Feb. 15, 2022, all of which are hereby incorporated by reference in their entireties.

FIELD OF THE INVENTION

The disclosure includes means for correcting a corrupted wireless message.

BACKGROUND OF THE INVENTION

Transmission faults are inevitable in wireless communication, due to noise, interference, attenuation, and other distortions. Faulted messages may lead to retransmission requests and other delays. In 5G and 6G, faulted messages are detected according to an error-detection code in the message, without determining which message elements are faulted. What is needed is means for determining which resource elements of a message are faulted, and means for repairing those faults.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for mitigating a faulted wireless message, the method comprising: receiving or determining a threshold; receiving or determining a plurality of predetermined amplitude levels of a modulation scheme; receiving the faulted message comprising message elements, each message element comprising a first signal multiplexed with a second signal in quadrature; for each message element, determining a first deviation and a second deviation, wherein the first deviation comprises an amplitude of the first signal minus a closest one of the predetermined amplitude levels of the modulation scheme, and wherein the second deviation comprises an amplitude of the second signal minus a closest one of the predetermined amplitude levels of the modulation scheme; determining a modulation quality of the message element according to the first deviation and the second deviation; and comparing the modulation quality to the threshold.

In another aspect, there is non-transitory computer-readable media in a wireless receiver, the media containing instructions that when implemented by a computing environment cause a method to be performed, the method comprising: receiving or determining a plurality of predetermined amplitude levels of a modulation scheme; receiving a message comprising message elements, each message element comprising an I-branch signal and a Q-branch signal 90-degree phase-shifted relative to the I-branch signal; determining, for each message element, an I-branch amplitude of the I-branch signal and a Q-branch amplitude of the Q-branch signal; determining, for each message element, an I-branch deviation comprising a difference between the I-branch amplitude and one of the predetermined amplitude levels of the modulation scheme, and determining a Q-branch deviation comprising a difference between the Q-branch amplitude and one of the predetermined amplitude levels of the modulation scheme; and determining, for each message element, a modulation quality according to the I-branch deviation and the Q-branch deviation.

In another aspect, there is a wireless transmitter configured to: transmit a data message to a receiver; receive a request message from the receiver, the request message specifying a particular portion of the data message; and retransmitting the particular portion of the data message to the receiver.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
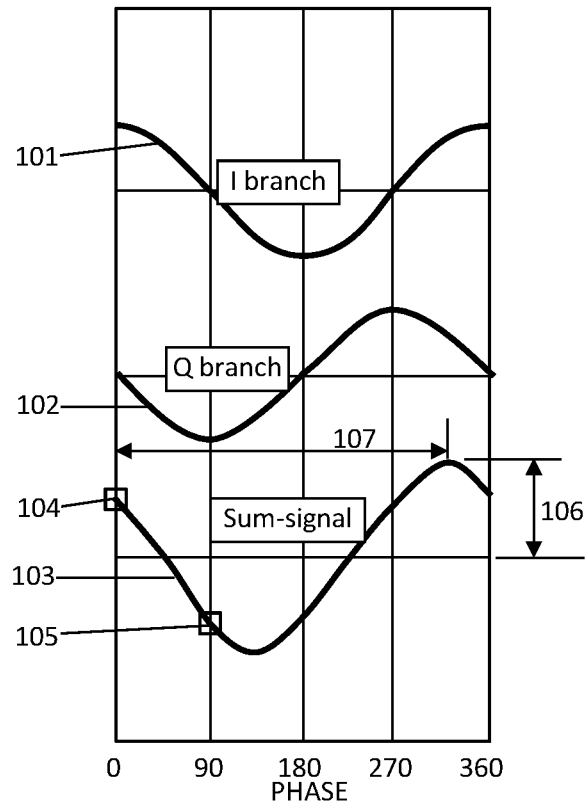
FIG. 1A is a chart showing exemplary embodiments of components of a PAM signal, according to some embodiments.

Disclosed herein are procedures for a wireless receiver to detect, localize, and correct individual errors in a received message, thereby enhancing reliability and avoiding retransmission delays. Systems and methods disclosed herein (the "systems" and "methods", also occasionally termed "embodiments" or "arrangements", generally according to present principles) can provide urgently needed wireless communication protocols to reduce retransmission burdens, improve reliability, and reduce overall delays in networks such as 5G and 6G networks, according to some embodiments. Commonly in wireless communication, interference or noise may distort one or more message elements, resulting in a corrupted message as received. Such a message is generally rejected by the receiving entity because the message disagrees with its error-detection code (EDC), such as a CRC (cyclic redundancy code) or a parity construct. Lack of an acknowledgement then prompts a retransmission, which takes extra time and extra signaling. However, the corrupted message contains a great deal of information despite the fault, especially if the fault is restricted to one or a few resource elements, and even the faulted message elements may contain valuable information to assist in error mitigation.

Procedures are disclosed for evaluating a modulation quality of each message element based on how well the modulation matches the calibrated amplitude levels of the modulation scheme. Further disclosures provide procedures for selecting a portion of a faulted message and requesting retransmission of that portion, instead of the entire message. For example, the receiver can determine which message elements are likely faulted according to a quality factor. The quality factor may be based on the modulation quality, which may be based on deviation or difference between the modulation of the message element and the nearest state of the modulation scheme. For example, in pulse-amplitude modulated messages, each state may include an I branch and a Q branch with a 90-degree offset, and the modulation quality may be based on the difference between amplitude of the I branch and one of the predetermined amplitude levels of the modulation scheme, and/or the difference between amplitude of the Q branch and one of the predetermined amplitude levels of the modulation scheme, and/or the amplitude and phase of the as-received sum-signal, and/or the SNR and other factors related to noise or interference. If the message faults are clustered in a portion of the message, the receiver may request that only the affected portion be retransmitted, using message formats disclosed below. The systems and methods disclosed herein can provide means for detecting one or more faulted resource elements in a message, and efficiently determining the correct value of those resource elements, thereby providing a low-latency and high-reliability solution to message fault problems, according to some embodiments.

Terms used herein generally follow 3GPP (Third Generation Partnership Project) usage, but with clarification where needed to resolve ambiguities. As used herein, "5G" represents fifth-generation and "6G" sixth-generation wireless technology. A network (or cell or LAN or local area network or the like) may include a base station (or gNB or generation-node-B or eNB or evolution-node-B or access point) in signal communication with a plurality of user devices (or UE or user equipment or nodes or terminals) and operationally connected to a core network (CN) which handles non-radio tasks, such as administration, and is usually connected to a larger network such as the Internet. "Receiver" is to be construed broadly, including processors accessible by the recipient of a message, and configured to perform calculations on received signals or messages. Embodiments may include direct user-to-user ("sidelink") communication such as V2V (vehicle-to-vehicle) communication, V2X (vehicle-to-anything), X2X (anything-to-anything, also called D2D or device-to-device) and base station communications or V2N (vehicle-to-network). "Vehicle" is to be construed broadly, including any mobile wireless communication device. The time-frequency space is generally configured as a "resource grid" including a number of "resource elements", each resource element being a specific unit of time termed a "symbol time", and a specific frequency and bandwidth termed a "subcarrier" (or "subchannel" in some references). Each subcarrier can be independently modulated to convey message information. Thus a resource element, spanning a single symbol in time and a single subcarrier in frequency, is the smallest unit of a message. "RNTI" (radio network temporary identity) or "C-RNTI" (cell radio network temporary identification) is a network-assigned user code. "QoS" is quality of service, or priority. "QCI" (QoS class identifier) defines various performance levels. "QPSK" (quad phase-shift keying) is a modulation scheme with two bits per message element, and "16QAM" (quadrature amplitude modulation with 16 states) is a modulation scheme with 4 bits per message element. "SNR" (signal-to-noise ratio) and "SINR" (signal-to-interference-and-noise ratio) are treated equivalently herein. "ACK" is an acknowledgement, "NACK" is a negative acknowledgement, and "NO-ACK" is the absence of any acknowledgement message.

"PAM" (pulse-amplitude modulation, not to be confused with signal generation by rapid pulsatile energy bursts) is a message modulation technology in which bits of a message are allocated to two sinusoidal "branch" signals, which are then amplitude-modulated to encode the message bits, and then summed with a 90-degree phase offset, and transmitted. The receiver can then receive the transmitted signal, separate the two branch signals, and measure their amplitudes. The receiver can demodulate the message elements by separating the two branch signals, measuring their amplitudes, and comparing to a set of predetermined amplitude levels of the PAM modulation scheme. The branches may be termed the "real" and "imaginary" branches, or the "I and Q" (in-phase and quadrature-phase) branches. A "constellation table" is a chart showing the I and Q modulation states of a PAM modulation scheme.

The "sum-signal" is the as-received waveform before separating the branches, or equivalently, the sum of the two branches. Each of the I-branch and Q-branch signals may be amplitude modulated according to one of the predetermined amplitude levels. For example, 16QAM has two predetermined amplitude levels, such as +1 and +3 in some units, and their negatives. Each branch can then be amplitude modulated as −3, −1, +1, or +3, thereby representing four possible "branch amplitudes". Each message element includes two branches, each of which has four branch amplitude possibilities, thereby providing 4×4=16 total modulation states, as expected for 16QAM.

In addition to the 3GPP terms, the following terms are defined herein. Although in references a modulated resource element of a message may be referred to as a "symbol", this may be confused with the same term for a time interval, among other things. Therefore, each modulated resource element of a message is referred to as a "modulated message resource element", or more simply as a "message element", in examples below. A "demodulation reference" is a set of modulated resource elements that exhibit levels of a modulation scheme (as opposed to conveying data). A "calibration set" is one or more amplitude values, which have been determined according to a demodulation reference, representing the predetermined amplitude levels of a modulation scheme, or the negative of those levels. A "sum-signal" is a signal produced by adding (or summing) the I-branch and Q-branch signals. A receiver, upon receiving the sum-signal, can separate the two branches therein, and measure the amplitude of each branch. A "branch amplitude" is the amplitude of an I or Q branch signal, as determined by a receiver. The receiver can demodulate a message element by extracting its I and Q branch signals, measuring their branch amplitudes, and comparing to the levels of a calibration set according to a preceding demodulation reference. An "amplitude deviation" of a message element is the difference between its I or Q branch amplitude and the closest predetermined amplitude level in the calibration set. Accordingly, the "modulation quality" of a message element is a measure of how close the I and Q branch amplitudes are to the closest predetermined amplitude level of the modulation scheme, or equivalently how close the modulation of the message element is to the closest state of the modulation scheme, as indicated by amplitude levels in the calibration set. Thus the "closest state" of the modulation scheme to a particular message element is the state that has the closest amplitude levels to the I-branch and Q-branch amplitudes. Each state corresponds to a first predetermined amplitude level and a second predetermined amplitude level, corresponding to the I-branch and Q-branch amplitudes of a demodulation reference, for example. The closest state to a particular message element is the state in which the difference between the first predetermined amplitude is closest to the message element's I-branch amplitude and the second predetermined amplitude is closest to the message element's Q-branch amplitude. The modulation quality may be calculated by adding those differences in magnitude, or the square root of the sum of the squares of the differences, or other formula relating the deviation of the message element's amplitudes from the modulation state's amplitudes.

A message may be configured "time-spanning" by occupying sequential symbol-times at a single frequency, or "frequency-spanning" on multiple subcarriers at a single symbol-time. An "EDC" (error-detecting code) is a field in a message configured to detect faults, such as a "CRC" (cyclic redundancy code) or a parity construct or the like. A message is "unicast" if it is addressed to a specific recipient, and "broadcast" if it includes no recipient address. Transmissions are "isotropic" if they provide roughly the same wave energy in all horizontal directions. A device "knows" something if it has the relevant information. A device "listens" or "monitors" a channel or frequency if the device receives, or attempts to receive, signals on the channel or frequency. A message is "faulted" or "corrupted" if one or more bits of the message are changed relative to the original message. "Receptivity" is the quality of reception of a message. If one or more elements of a "subject" message have been changed when received, the message "fails the EDC test", that is, the embedded error-detection code disagrees with the bit-level content of the message. The fault may have occurred during the modulation step in the transmitter, or in propagation through the air, or at the receive side, and may be due to electronic noise or external interference or atmospheric absorption or scattering or reflection of the electromagnetic wave, to name just a few possible sources of message faults. Distortion of the I and Q branch amplitudes can cause the receiver to incorrectly demodulate the message elements, in which case the message fails the EDC test.

Upon detecting a faulted message, the recipient in 5G/6G can do one of several things. If the recipient knows that the faulted message is intended for that recipient, such as a base station that has scheduled an uplink message at a particular time or a user device receiving a scheduled downlink message, the recipient can request a retransmission after detecting the fault. For most downlink control messages, however, the user device does not know the time or frequency or length of the message, or even if the message is intended for that user device, because in 5G and 6G the downlink control messages are generally scrambled by the recipient's identification code. User devices then perform a "blind search" by attempting to unscramble candidate downlink control messages to locate their messages. However, a faulted message will disagree with its error-detection code, causing the message to appear as intended for some other user device, and would be ignored by the intended recipient. Then the user device, upon failing to receive the message within a predetermined interval, can request a retransmission, if it is expecting a message. Alternatively, the base station can retransmit the message after failing to receive an expected acknowledgement, among other options. In each case, substantial time is lost, and substantial extra transmission power is wasted, responding to a faulted message. Such delays may be especially critical for low-latency applications such as remote surgery and traffic safety.

In contrast, the disclosed systems and methods may provide message fault correction in a fraction of the time by selecting a portion of the faulted message to be retransmitted, thereby repairing the message, avoiding unnecessary retransmission delays, enhancing network reliability, and avoiding adding to the electromagnetic background, among other benefits, according to some embodiments. For example, the receiver can determine a "quality factor" of each message element according to the modulation quality, and optionally the SNR, and other factors. The "modulation quality" of each message element is a measure of how far the I and Q branch amplitude values of the message element deviate from the closest predetermined amplitude levels of the modulation scheme. The receiver can determine where the "suspicious" message elements are located in the message, the suspicious elements having a quality factor lower than a threshold value, and can request that just the affected portion be retransmitted. After receiving the retransmitted portion, the receiver can then merge the two versions by selecting whichever message element has the higher modulation quality, thereby eliminating most or all faulted message elements from the merged version.

Following are examples of PAM modulation schemes, according to which a faulted message element may be revealed and possibly repaired.

FIG. 1A is a chart showing exemplary embodiments of components of a PAM signal, according to some embodiments. As depicted in this non-limiting example, a PAM-modulated message element includes two "branches" labeled I and Q, each branch being a sinusoidal signal which is amplitude modulated at one of the predetermined amplitude levels (or its negative) of the modulation scheme. The branch amplitudes thereby encode the bits of the message element. The I branch 101 is depicted here as a cosine curve, while the Q branch 102 is a sine curve. The two branches 101, 102 are summed and transmitted as the sum-signal 103. The Q branch has zero signal at a zero-degree phase where the I branch is maximum, and the I branch is zero at the 90-degree phase at which the Q branch is maximum. The receiver, by selecting each branch separately (using RF mixers, for example), can measure the amplitude of each branch, and thereby identify the message bits encoded in those amplitude levels. For example, the receiver may determine that the "branch amplitude" of the I branch 101 is as indicated by a square 104, and the amplitude of the Q branch 102 is as indicated by another square 105.

Generally, the transmitter sets each of the branch amplitudes 104 and 105 to equal one of the predetermined amplitude levels of the modulation scheme, or its negative. For example, in 16QAM with PAM modulation, there are two predetermined amplitude levels (such as +1 and +3 in some units), and their negatives. Each branch can then be amplitude modulated according to one of the predetermined amplitude levels or its negative, such as +3, +1, −1, −3). In this context, the "predetermined amplitude levels of the modulation scheme" can include both positive and negative values, thereby including all four predetermined values in the calibration set by which the received message elements are then demodulated. The values are generally arranged to be uniformly separated. The sum-signal 103 is the sum of the two branches 101 and 102, each with a branch amplitude set equal to one of those four values, thereby constructing 16 possible states. Higher-order modulation include more predetermined levels (three in 64QAM, in for 256QAM, and so forth). QPSK, with 4 states, has only a single predetermined amplitude level, which can be positive or negative for each of the two branches, thereby forming 4 states as expected. As mentioned, in PAM the number of states in the modulation scheme is then $(2L)^2$, accounting for both positive and negative values of the L predetermined amplitude levels of the modulation scheme.

In some embodiments, the receiver can also analyze the sum-signal itself 103 to extract further information about the modulation quality, or to reveal modulation information more readily measured than the branch amplitudes. For example, the figure further indicates as 106 the amplitude of the sum-signal, and its peak phase as 107. As described below, the receiver may extract fault information by testing the sum-signal properties, and/or by comparing the sum-signal properties to the expected PAM levels.

Figure 1B:
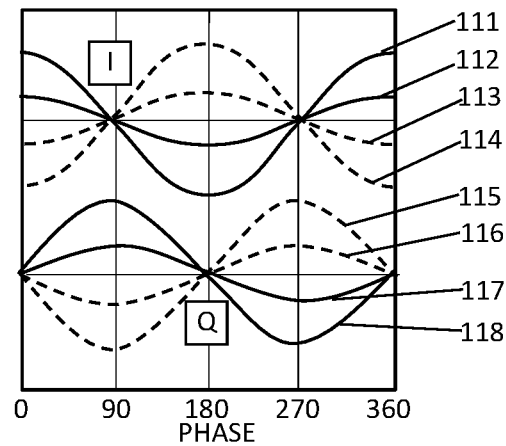
FIG. 1B is a chart showing exemplary embodiments of further components of a PAM signal, according to some embodiments.

FIG. 1B is a chart showing exemplary embodiments of further components of a PAM signal, according to some embodiments. As depicted in this non-limiting example, eight waves are shown depicting I branches and Q branches for various modulation states. In PAM, a small number (such as two) positive amplitude levels may be predetermined. In modulating the branches of a message element, the amplitude levels may be provided as either positive or negative values, and the phase may be provided as zero or 90 degrees, thereby composing the eight curves depicted. The message element is then transmitted with one of the four I waves added to one of the four Q waves, thereby generating 16 states of a modulation scheme such as 16QAM. In higher order modulation, more amplitude levels are provided, but the procedure is the same.

More specifically, wave 111 represents the maximally positive I branch signal, 112 the minimally positive I signal, and 113 and 114 the minimally and maximally negative I signals, respectively. On the Q branch, 118 and 117 are the maximally and minimally positive levels, while 115 and 116 are the maximally and minimally negative signals, respectively. The receiver, by determining which of the predetermined amplitude levels most closely matches the detected I or Q branch amplitude, can thereby demodulate the message element.

Figure 1C:
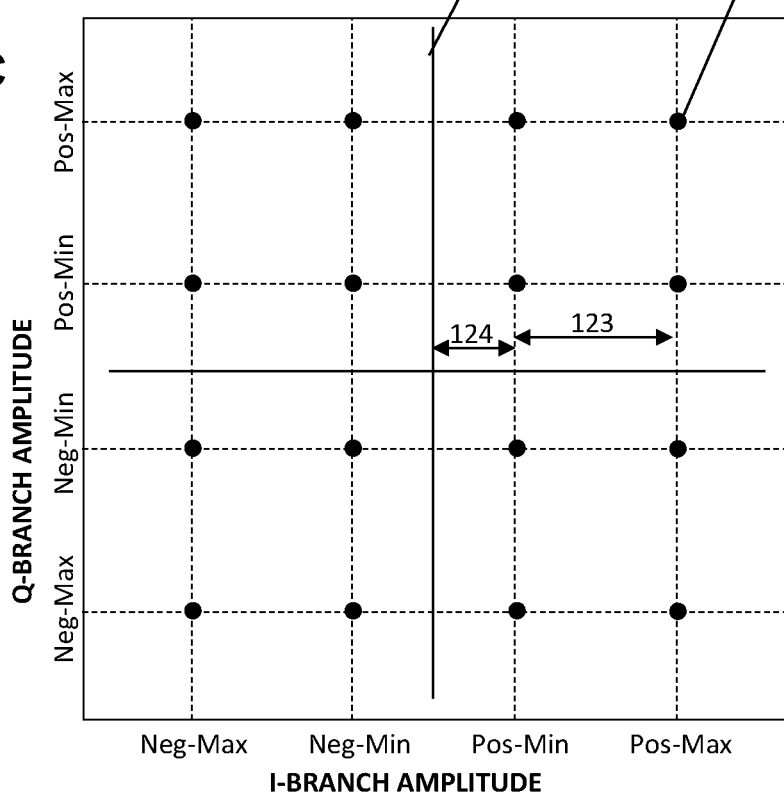
FIG. 1C is a "constellation" table showing an exemplary embodiment of states of a PAM modulation scheme, according to some embodiments.

FIG. 1C is a constellation chart showing an exemplary embodiment of states of a PAM modulation scheme, according to some embodiments. As depicted in this non-limiting example, 16 states are indicated as dots 125 in an array with the predetermined I-branch amplitude levels shown horizontally and the Q-branch amplitude levels vertically. The branch levels are labeled as "Pos-Max" for the maximally positive amplitude value, "Pos-Min" for the minimally positive amplitude level, then "Neg-Min and Neg-Max" for the maximally and minimally negative amplitude states. The transmitted message element is composed of one I-branch amplitude signal plus one Q-branch amplitude signal, transmitted together as a sum-signal.

The central cross shape 122 indicates zero amplitude. In PAM generally, zero amplitude is not used for messaging, and the branch phases are offset from the carrier by 45 degrees for carrier suppression. In the chart, the minimally positive amplitude is each displaced from zero by the value 124, and the maximally positive level is an additional amount 123. For example, the value 124 could represent one unit and the value 123 could represent two units, thereby providing that the various states are all separated from their adjacent neighbors by the same amount, namely two units. The receiver, by measuring the I and Q branch amplitudes and comparing to a previously-determined set of amplitude levels (from a demodulation reference, for example), can select the modulation state with the closest match to the measured amplitudes and thereby demodulate the message element.

The following examples indicate how faulted message elements in a PAM-modulated message may be detected.

Figure 2A:
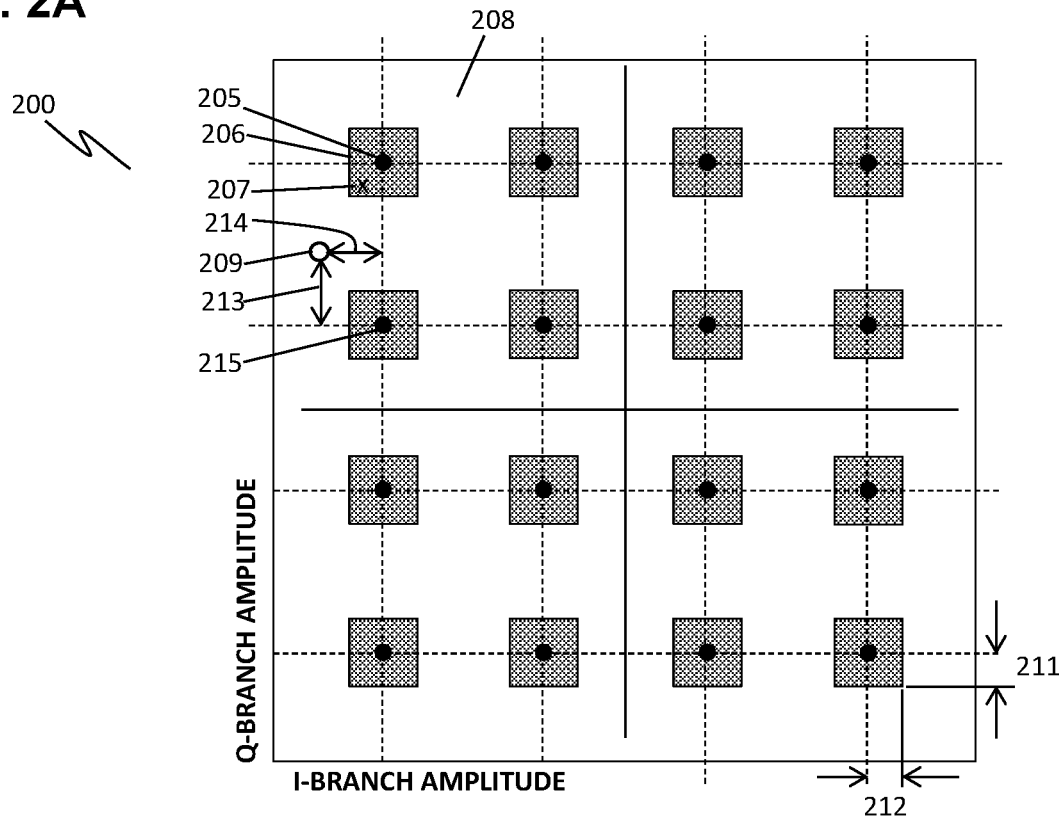
FIG. 2A is a schematic showing an exemplary embodiment of a constellation table for 16QAM, according to some embodiments.

FIG. 2A is a schematic showing an exemplary embodiment of a PAM constellation table, according to some embodiments. As depicted in this non-limiting example, a constellation table 200 includes 16 states 205 of 16QAM, each state 205 including one of the four I-branch amplitudes summed with one of the four Q-branch amplitudes. Around each modulation state 205 is a rectangular form in dark stipple representing a "good-modulation zone" 206 (or "good-mod" in figures). The size of the good-modulation zone 206 is shown as the dimensions 211 and 212. Usually, the good modulation zone 206 is square. If the receiver measures the message element's branch amplitudes to be within one of the good-modulation zones 206, the message element is assigned to the associated modulation state 205. For example, the small "x" 207 indicates a measured as-received message element, having an I-branch amplitude and a Q-branch amplitude accordingly, thereby falling within the good-modulation zone 206 of the associated state 205.

The exterior white space 208 is a "bad-modulation zone" (or "bad-mod") in which the modulation of the message element falls outside all of the good-modulation zones, and therefore is invalid or illegal and not used for modulation. For example, a particular message element is received with modulation in I and Q amplitudes as depicted by an "o" 209, which is in the bad-modulation zone 208. The received message element may exhibit an I-branch amplitude deviation 214 and a Q-branch amplitude deviation 213 relative to the closest modulation state, which in this case is 215. If the I-branch amplitude deviation 214 is greater than the good modulation zone width 212, or the Q-branch amplitude deviation 213 is greater than the good modulation zone height 211 (relative to the nearest state 215), then that message element is flagged as bad-modulation. In some embodiments, the bad-modulation message elements may be assigned to the nearest modulation state 215 initially, although this assumption may be revised later if the message fails its error-detection test.

After all of the message elements have been assigned to the closest states of the modulation scheme, the message may be checked against an error-detection code which is normally embedded in the message. If the message agrees with the error-detection code, the tentative assignment of the bad-modulation message elements is confirmed, and the message has been successfully demodulated. If not, the receiver may attempt to recover the message by altering the bad-modulation message elements. As used herein, "altering" a message element means changing which state of the modulation scheme is assigned to the message element. After changing the assigned state of the suspicious message element, the altered message may be tested again with the error-detection code to see if the altered message is the correct version.

Figure 2B:
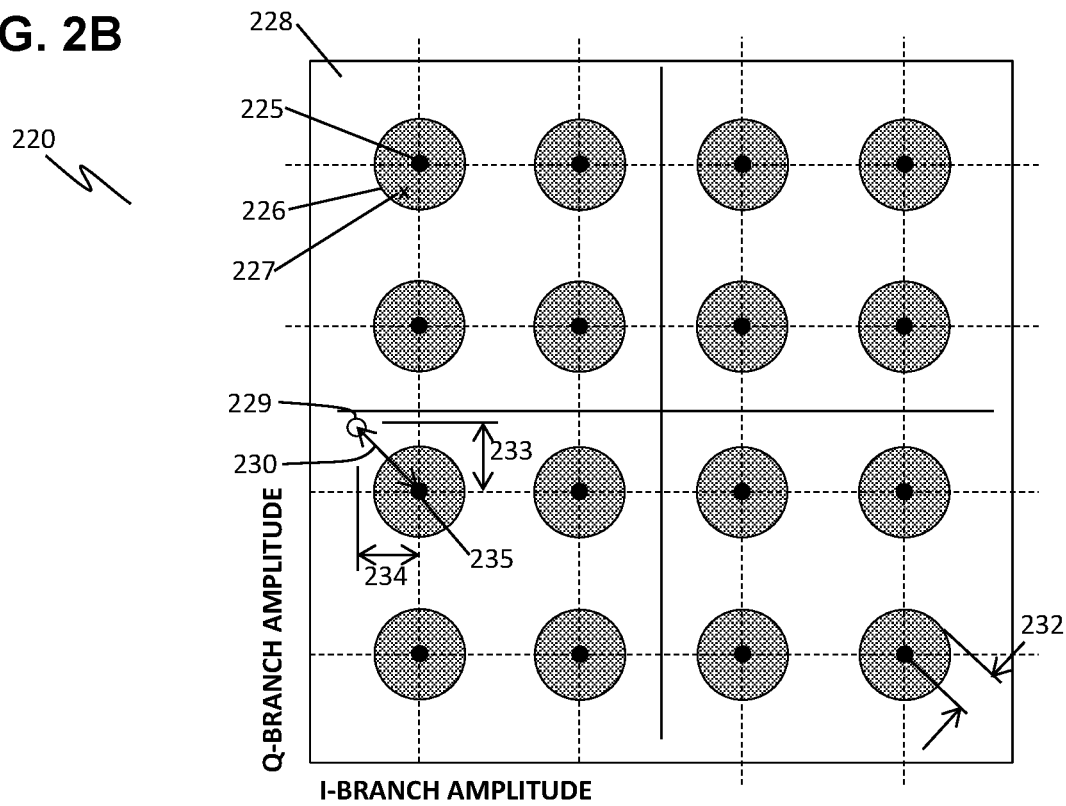
FIG. 2B is a schematic showing another exemplary embodiment of a constellation table for 16QAM, according to some embodiments.

FIG. 2B is a schematic showing another exemplary embodiment of a PAM constellation table for 16QAM, according to some embodiments. As depicted in this non-limiting example, the constellation table 220 may include four I-branch amplitude levels and four Q-branch amplitude levels, for sixteen states 225. Each state 225 is surrounded in this case by a circular good-modulation zone 226, each with a radius 232 as indicated. The exterior white space 228 represents bad-modulation.

A particular message element "x" 227 is shown in a good-modulation zone 226 associated with the state 225. The radial distance (not labeled) between the message element's modulation and the closest state is less than the radius 232 of the good-modulation zones.

Another message element "o" 229 has an I-branch amplitude deviation 234 and a Q-branch amplitude deviation 233, and is at a distance 230 from the nearest state 235. If that distance 230 is less than the radius 232 of the good-modulation zone, the message element is allocated to "good-modulation". However, in this case the distance 230 is greater than the radius 232, and therefore the message element is flagged as "suspicious" or "bad-modulation" and may be altered later for fault mitigation, if needed. Initially, however, the message element may be assigned to the nearest state 235 for purposes of demodulating the message.

While the figure shows the 16QAM modulation scheme, many other modulation schemes are possible. For example, 64QAM and 256QAM involve additional I and Q amplitude levels, whereas QPSK has only a single amplitude level (repeated positive and negative, I and Q, thereby making four QPSK states). The methods described herein for 16QAM can be applied straightforwardly to QPSK and higher QAM modulation schemes, according to some embodiments.

The figure, and the other examples to follow, are presented according to a standard pulse-amplitude modulation scheme. In other embodiments, however, the message may employ classical amplitude and phase modulation, in which each message element is amplitude modulated according to one of Namp amplitude levels and phase-modulated according to one of Nphase phase levels. The multiplexed amplitude and phase modulations thereby generate Namp×Nphase distinct states. For example, with classical amplitude-phase modulation, 16QAM has four amplitude and four phase levels, resulting in 16 combinations. Upon receipt, the receiver measures the amplitude and phase of the signal, then selects whichever predetermined state most closely matches those values. The systems and methods described herein are straightforwardly applicable to classical amplitude and phase modulation as well as other modulation technologies. As long as the modulation scheme involves modulating the phase and/or the amplitude of an electromagnetic wave, it is immaterial which modulation technology is employed. For consistency and clarity, most of the examples refer to PAM, however the principles disclosed herein may apply to each of these modulation technologies, as will be apparent to artisans with ordinary skill in the art after reading the present disclosure.

Figure 3:
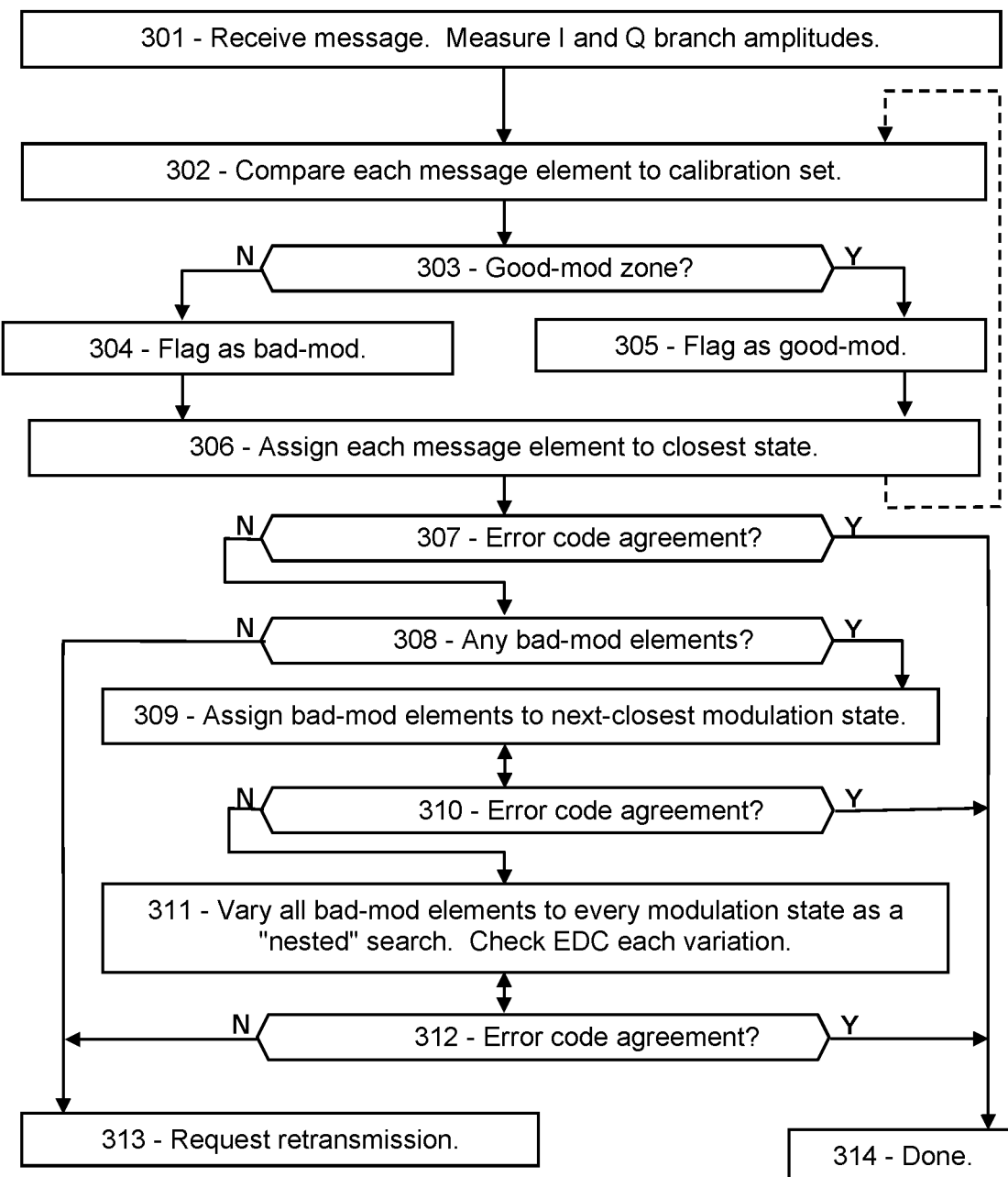
FIG. 3 is a flowchart showing an exemplary embodiment of a process for detecting and correcting message errors, according to some embodiments.

FIG. 3 is a flowchart showing an exemplary embodiment of a process for detecting and correcting message errors, according to some embodiments. As depicted in this non-limiting example, a receiver may receive a message at 301, and may measure the amplitude of each I and Q branch of each message element at 302, and compare each message element's amplitude values to the amplitude levels of a calibration set, which represents the states of the modulation scheme. At 303, the receiver determines whether each message element's amplitude values fall within a predetermined range of one of the states of the modulation scheme. If so, at 305 the message element is flagged as good-modulation. If the message element's amplitudes are outside the range of the states of the modulation scheme (or if the distance to the nearest state is greater than the good-modulation radius), then the message element is flagged as bad-modulation at 304. In either case, at 306 the message element is assigned the nearest modulation state initially. The state determinations, allocations, and assignments are repeated for each message element, as suggested by a dashed arrow.

At 307, after assigning each message element to the closest state, the receiver can compare the message to an error-detection code. If there is agreement, the message is assumed to be correctly demodulated, and the task is done at 314. If the message fails the error-detection code, then at 308 the receiver can determine whether the message includes any message elements flagged as bad-modulation. If not, then the receiver may request a retransmission at 313, or other action depending on reception rules and other conditions. If at 308 there is at least one message element flagged as bad-modulation, then at 309, the receiver may alter the assigned state of each bad-modulation element to the next-closest modulation state instead of the closest one. The "next-closest" state is the closest state to the message element's modulation, except the closest one. Some types of noise and interference cause mainly small changes in the branch amplitudes of the message elements, and therefore an economical strategy for recovering the message may be to alter each bad-modulation element by a small amount, testing each such alteration against the error-detection code.

At 310, the message with the altered assignment is tested against the error-detection code, and if there is agreement, the task is done at 314. If not, the receiver may continue altering any remaining bad-mod element assignments to their next-closest state, one at at time, and test each alteration. After testing each one of the bad-mod elements individually in this way, the receiver can then alter the bad-mod elements two at a time, testing each alteration for agreement with the error-detection code. If not successful, the receiver can alter the assignments in combinations of three, and other numbers of bad-mod elements, altering each one to the nearest and next-nearest states of the modulation scheme. The receiver can continue varying the bad-mod elements until all possible combinations of the bad-mod elements have been altered to their next-closest state of the modulation scheme, and can test each altered message against the error-detection code. This process is a loop, cycling through steps 309 and 310 repeatedly until all combinations have been tested. However, for clarity in the figure, the steps are shown simply as a command 309 and an interrogator 310, with a double-ended arrow between them. The double-ended arrow indicates that the two steps are to be performed repeatedly and cyclically until all the associated variations have all been tested, and aborting the loop if any of the variations passes the EDC test.

If the message fails the error-detection test for all of the alterations of the bad-mod elements to their closest and next-closest states, the flow proceeds to 311 for a more exhaustive search. Here each of the bad-mod message elements is again altered sequentially, but now they are varied to all of the states of the modulation scheme, instead of being restricted to just the closest and the next-closest states, and each such alteration is tested (skipping the already-tested alterations, however). Each of the bad-mod message elements can be tested sequentially at each of the states, while all of the other bad-mod message elements are also altered in turn. Such a grid search, in which two or more items are independently varied among multiple settings, and all possible combinations are tested, may be termed a "nested" search. For example, if there are B bad-mod message elements and the modulation scheme has S states, the number of combinations is $S^B$ separate tests. If any of those tests results in agreement with the error-detection code at 312, the task is done at 314. If none of the tests is in agreement, at 313 a retransmission is requested. The current message is then abandoned, or, in another embodiment, the message may be retained for analysis when the retransmitted version is received.

In most cases, the time required for a retransmission may be much longer than the time required to alter an assigned modulation state of a message element and compare to the error-detection code, and therefore it may be economical to attempt to repair the faulted message in this way, by altering the state assignments of the message elements having the worst modulation quality, as measured by how far the branch amplitude values fail to match the levels of the calibration set. However, there is a limit to how many alterations the receiver can test in a given time. If the number of bad-modulation message elements exceeds a threshold number, the receiver may request a retransmission immediately instead of embarking on a probably futile effort to repair the message.

Figure 4A:
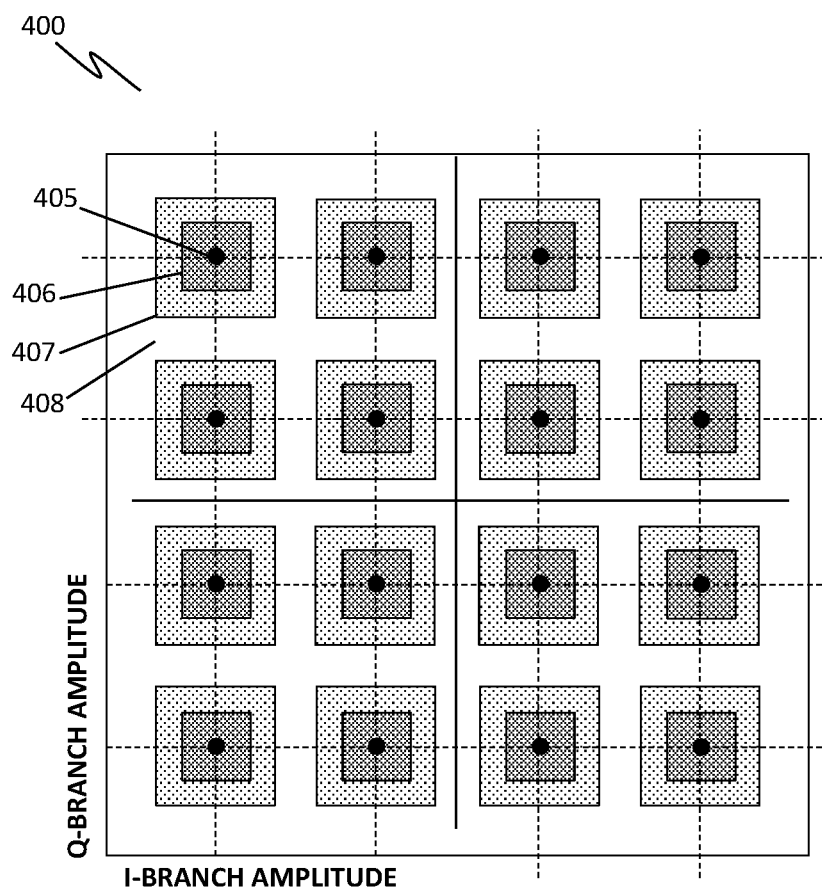
FIG. 4A is a schematic sketch showing an exemplary embodiment of a constellation table with multiple levels of modulation quality, according to some embodiments.

FIG. 4A is a schematic sketch showing an exemplary embodiment of a constellation table with multiple levels of modulation quality, according to some embodiments. As depicted in this non-limiting example, a constellation table 400 (for 16QAM in this case) includes four I-branch amplitude levels, four Q-branch levels, and sixteen states 405. Around each state 405 is a good-modulation zone 406 in dark stipple, surrounded by a marginal (that is, marginal quality) modulation zone 407 in light stipple, and the remaining white space 408 is a bad-modulation zone. A message element with modulation falling in (or occupying) one of the good-modulation zones 406 may be assigned to the associated state 405 of the modulation scheme. A message element with modulation falling in the marginal-modulation zone 407 may also be assigned to the associated state 405, but with a flag indicating that it is suspicious due to its lower quality of fit to the predetermined amplitude levels. A message element with modulation falling in the bad-modulation zone 408 may be assigned to the nearest state 405, but with a flag indicating that it is bad-modulation or very suspicious. If the message is subsequently determined to be faulted, the bad-modulation elements may be altered first, to determine whether any alterations may satisfy the EDC test. If none of those variations succeeds in agreeing with the error-detection code, then the bad-modulation elements and the marginal-modulation elements may be varied together in a nested grid search. The lowest-quality, bad-modulation elements may be varied first because they are the most likely sources of the message failure. If those variations fail to agree with the error-detection code, or if there are no bad-modulation elements, then the message elements with marginal quality modulation may be varied. However, if the number of bad-modulation and marginal-modulation elements exceeds a maximum value, the receiver may request a retransmission instead of performing a grid search, due to the time and calculational effort required to perform large numbers of variations.

Figure 4B:
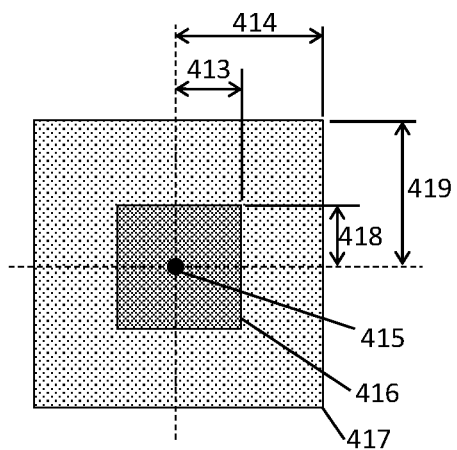
FIG. 4B is a schematic sketch showing an exemplary embodiment of a single modulation state with multiple levels of modulation quality, according to some embodiments.

FIG. 4B is a schematic sketch showing an exemplary embodiment of a single modulation state with multiple levels of modulation quality, according to some embodiments. As depicted in this non-limiting example, a modulation state 415 (such as one of the modulation states of the previous figure) may be configured as the multiplexed I and Q amplitude modulations of the modulation scheme. The modulation state 415 may be surrounded by a good-modulation zone 416, and further surrounded by a marginal-modulation zone 417. The good-modulation zone 416 may be a rectangular region with a half-width 413 in the I-branch and 418 in the Q-branch as shown. The marginal-modulation zone 417 may be a rectangular region with half-dimensions 414 and 419. Message elements modulated in the good-modulation zone 416 may be assigned the associated state 415 with high probability. Message elements modulated in the marginal-modulation zone 417 may also be assigned the state 415 too, but flagged as suspicious. Message elements modulated exterior to the marginal-modulation zone 417 may also be assigned the state 415 if that is the closest one, but may be flagged as likely bad-modulation for the purposes of mitigating faults.

Figure 4C:
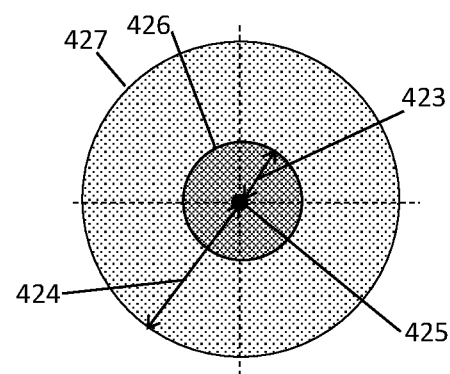
FIG. 4C is a schematic sketch showing another exemplary embodiment of a single modulation state with multiple levels of modulation quality, according to some embodiments.

FIG. 4C is a schematic sketch showing another exemplary embodiment of a single modulation state with multiple levels of modulation quality, according to some embodiments. As depicted in this non-limiting example, a single modulation state 425 may be surrounded by a round region of good modulation 426 which may be surrounded by an annular region of marginal quality modulation 427. The radius 423 of the good-modulation region 426 is shown, and the outer radius 424 of the marginal-modulation region 427 is shown. Thus a message element may be allocated to the good-modulation category if the I and Q branch amplitudes are such that the modulation falls in the good-modulation zone 426, and likewise for the marginal-modulation zone 427. For example, the "distance" of the message element from the state 425 may be calculated as the square root of the I-branch amplitude deviation squared plus the Q-branch amplitude deviation squared. If this distance is less than the good-modulation radius 423 the message element, is allocated good modulation quality. If the distance is greater than the good-modulation radius 423 but less than the marginal-modulation radius 424, the message element may be allocated marginal modulation quality. If the distance is greater than the marginal-modulation radius 424, the message element may be allocated bad modulation quality. The foregoing examples involved categorizing message elements into two or three categories according to modulation quality, and altering the message elements in each category. In some embodiments, the receiver may use any number of such categories, not restricted to two or three. In some embodiments, the receiver may eschew categories and may instead select which message elements to alter based on the calculated distance, in phase-amplitude space, of each message element from the closest state.

Figure 5:
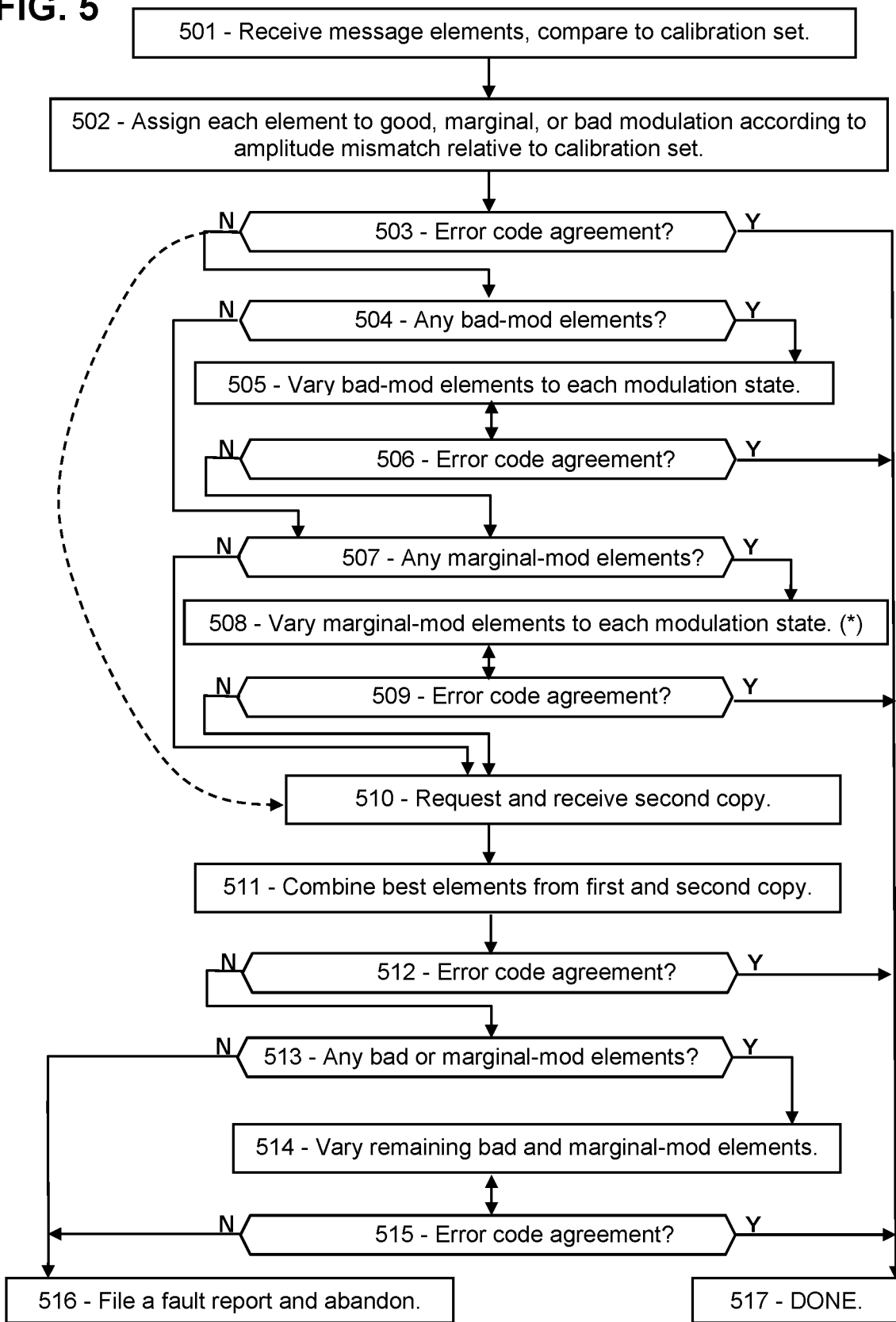
FIG. 5 is a flowchart showing an exemplary embodiment of a process for detecting and correcting message errors using multiple levels of modulation quality, according to some embodiments.

FIG. 5 is a flowchart showing an exemplary embodiment of a process for detecting and correcting message errors using multiple levels of modulation quality, according to some embodiments. As depicted in this non-limiting example, at 501 a receiver receives a message and compares each message element to the amplitude levels previously provided in a calibration set. The calibration set includes the I-branch and Q-branch amplitude levels of the modulation scheme, as provided by a demodulation reference, for example. At 502, the receiver assigns each message element to the closest state of the modulation scheme, and also categorizes the modulation quality of each message element as good, marginal, or bad-modulation depending on the distance of the message modulation to the nearest state of the modulation scheme. After attempting to demodulate the message elements, the receiver compares the message to an error-detection code at 503. If the message agrees with the error-detection code, the task is done at 517. If not, the receiver checks, at 504, whether the message contains any bad-modulation elements, and drops to 507 if not. If the message has one or more bad-modulation elements, at 505 the receiver varies the bad-modulation elements among all of the states of the modulation scheme in a nested grid search, as indicated by a double arrow. For example, the receiver may alter the first bad-modulation element successively to each state, while keeping the other bad-modulation elements assigned to their closest states, and may test each variation against the error-detection code. The receiver may perform a similar scan using the second bad-modulation element while keeping all the others at their closest state values, and may continue such a single-element variation until all of the bad-modulation elements have been explored individually. Then, if no match has been found, the receiver may vary combinations of the bad-modulation elements across all of the states, testing all combinations of the bad-modulation elements at all states of the modulation scheme. If any one of those variations satisfies the error-detection code, the message is correctly demodulated and the task is done at 517. If not, the flow proceeds to 507.

At 507, the receiver determines whether the message has any marginal-modulation elements, and if so, it varies the marginal-modulation elements and the bad-modulation elements together in a nested search at 508, as indicated by a double arrow. (The asterisk is explained later.) The receiver can vary the bad and marginal-modulation elements in an exhaustive grid search by setting each of the suspicious elements to each of the states of the modulation scheme, and test the error-detection code for each variation at 509. If any of those variations agrees with the error-detection code, the task is done. If not, or if there are no marginal-modulation elements, the receiver may request and receive a second copy of the message at 510, and may merge the first and second copies by selecting the message elements with the best quality modulation at 511, and then may test the merged version against the error-detection code at 512. If successful, it is done. If not, the flow proceeds to 513.

At 513, the receiver may determine whether the merged message still includes any bad or marginal-modulation elements. The receiver may also note any message elements that differ in the originally received version and the retransmitted version, yet occupy good-modulation zones in each version. Such message elements are termed "paradoxical", and may be flagged as suspicious since the two message copies contradict each other. If the merged message has all good-modulation message elements and no suspicious (bad or marginal or paradoxical) message elements, yet still fails the EDC test, then there is some kind of problem, in which case the receiver may abandon the message at 516 and optionally file a fault report. However, if the merged message has one or more suspicious message elements at 514, the receiver may vary those in another nested search such as described above, testing each variation at 515. If one of those variations agrees with the error-detection code, the task is finally done. If not, the receiver may abandon at 516.

In some embodiments, the receiver may determine the modulation quality as a calculated value, instead of the good-marginal-bad categories. The receiver can then vary the remaining suspicious elements according to the modulation quality value, starting with the message element that has the lowest modulation quality. The receiver can then proceed to vary and test the second-lowest modulation quality message element, and so forth until the error-detection code matches.

In some embodiments, the amount of time required to perform the searches of 506 and 509 may exceed the amount of time to request and receive a second copy of the message, in which case the receiver may request the second copy as soon as the initial version fails the error-detection code, as indicated by a dashed arrow. The receiver may already know how much time it takes to test all combinations given the number of bad and marginal-modulation elements, using an algorithm for example. While waiting for a retransmission, the receiver may continue to test variations, since the receiver might succeed in demodulating the message before the retransmitted message arrives.

In some embodiments, the variations of the marginal-modulation message elements at 508 may be done in two stages for improved efficiency, as indicated by an asterisk (*). Many types of noise cause only small changes in the modulation of message elements, whereas interference from a nearby transmission can cause a large change in the message element. If the background is due mainly to noise or to low-amplitude interference, the amount of distortion produced upon each message element may be small. In that case, the message elements with marginal quality modulation are likely to belong to the associated state or to one of the adjacent states of the modulation scheme, as opposed to a more distant state that differs by a large amount in amplitude and phase. Therefore, the distortion is more likely to move the I-branch or Q-branch amplitude (or both) by one amplitude step than a larger number of amplitude steps. The receiver may exploit this by altering each of the marginal-modulation message elements to its nearest neighbors and testing those small-step alterations first, before attempting larger jumps. For example, a particular state of the modulation scheme has eight adjacent states if the particular state is in the middle of the constellation table, or five adjacent states if at one edge, or three adjacent states if at a corner. The receiver may save time and enhance the likelihood of finding a solution by testing those eight (or five or three) nearest-neighbor alterations first, before testing the larger variations across the entire constellation table. If the message has more than one marginal-modulation element, the receiver may perform a nested grid search by altering the assigned state of each of the marginal-modulation message elements to each of their adjacent states, exploring all combinations of all marginal-modulation elements in their adjacent states. If none of those adjacent-neighbor alterations passes the EDC test, then the receiver may proceed to vary the marginal-modulation message elements across the entire set of states of the modulation scheme (preferably skipping the alterations that have already been checked). By testing the most likely combinations of message alterations first, the receiver may avoid a large number of unlikely variations, and may thereby resolve the fault and recover the correct message quickly, according to some embodiments.

The systems and methods disclosed herein further include "directional sectors" defined around each state of the modulation scheme. The directional sectors may indicate how a faulted message may be recovered, according to some embodiments.

Figure 6A:
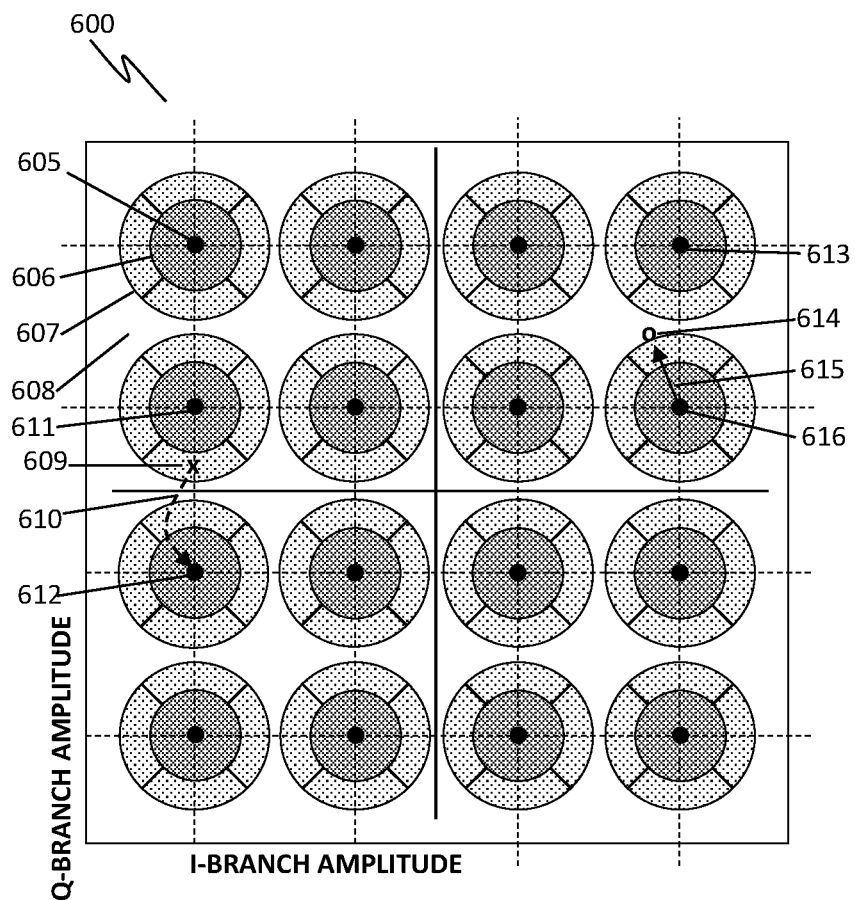
FIG. 6A is a schematic sketch showing an exemplary embodiment of a constellation table for 16QAM with directional deviation sectors, according to some embodiments.

FIG. 6A is a schematic sketch showing an exemplary embodiment of a constellation table for 16QAM with directional deviation sectors, according to some embodiments. As depicted in this non-limiting example, a constellation table 600 includes states 605, each state surrounded by a good (quality) modulation zone 606 and a marginal (quality) modulation zone 607 within white space bad (quality) modulation area 608. The marginal-modulation zones 607 are divided into multiple sectors, as explained in more detail in the next figure.

The sectors may assist the receiver in recovering a faulted message. For example, if a message fails the EDC test, the receiver may look for a particular message element modulated in a marginal-modulation zone 607, such as the "x" 609. The message element represented by the "x" 609 is initially assigned to the nearest state which is 611. However, since the message fails the error-detection test with that assignment, and since the "x" message element's modulation quality is only marginal, the receiver may attempt to correct the message by altering the assignment to a different state. For example, the receiver may alter the assignment to the adjacent state in a direction indicated by the sector that the "x" 609 occupies, that is, altering the assignment to the state 612. In the depicted case, the "x" 609 is in a sector directed toward a lower Q-branch amplitude state with the same I-branch amplitude, and therefore the receiver may attempt altering the message element to the next-lower Q-branch amplitude 612, as indicated by a dashed arrow 610, and may test that message alteration against the EDC code. Direction-assisted alteration may be an economical strategy for mitigating a message fault first in a direction as indicated by the occupied sector, before embarking on a wider search. The receiver may thereby enhance the probability that the correct state assignment may be determined without having to vary multiple message element assignments across the entire modulation table.

The figure further depicts another message element "o" 614 which lies in the bad-modulation zone 608 but has been assigned to the nearest state 616 of the modulation scheme. Also shown is an arrow 615 indicating a direction of the message element's modulation relative to the nearest state 616. If the message is found to be faulted, then the bad-modulation message element 614 may be re-assigned to the closest neighboring state in the direction of the arrow 615, which in this case is the state 613, and that alteration may be tested against the error-detection code. Instead of using sectors to define a direction, and instead of restricting the directionality to just the marginal-modulation elements, the arrow 615 pointing toward the message element's location on the constellation table may be used to guide the first and most likely alteration, which is to state 613 in this case.

In some embodiments, the receiver may determine which message elements are most likely faulted, and in which direction to alter the state assignment, according to calculations instead of zones and sectors. For example, the receiver can determine a modulation quality according to a distance from the message element's modulation to the nearest state of the modulation scheme, and can calculate a direction according to the position of the message element's modulation relative to the nearest state. If the distance is larger than the distances of any of the other message elements of the message, then the receiver may alter the state assignment of that lowest-quality message element to the adjacent state in the direction calculated, and thereby test the most likely version of the message before embarking on a long and tedious nested search.

Figure 6B:
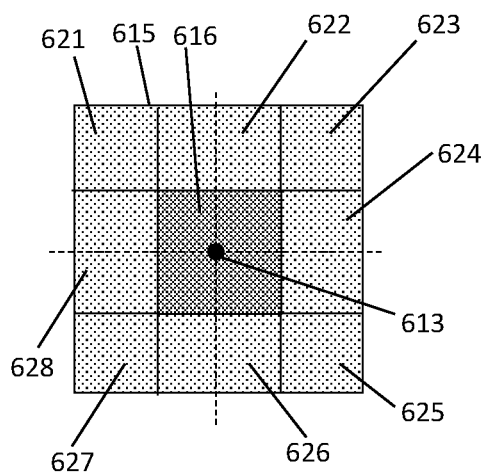
FIG. 6B is a schematic sketch showing an exemplary embodiment of a single modulation state with directional deviation sectors, according to some embodiments.

FIG. 6B is a schematic sketch showing an exemplary embodiment of a single modulation state with directional deviation sectors, according to some embodiments. As depicted in this non-limiting example, a modulation state may include a state 613 with a good-modulation zone 616 surrounded by a marginal-modulation zone 615. The marginal-modulation zone 615 is divided into eight sectors in this case, 621, 622, 623, 624, 625, 626, 627, and 628. The sectors 621-628 may assist the receiver in determining how to modify and recover a faulted message. For example, if the message as-received fails the error-detection code and one of the message elements is modulated according to, say, sector 624, then the receiver may alter that message element to the adjacent state in the indicated direction, and may test that variation.

Figure 6C:
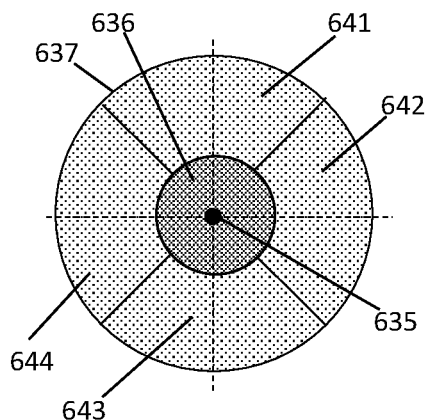
FIG. 6C is a schematic sketch showing another exemplary embodiment of a single modulation state with directional deviation sectors, according to some embodiments.

It may be noted that a state may not have an adjacent state in a specified direction. If the current modulation state 613 is already at the edge of the constellation table, then the receiver cannot increase the state assignment further, and therefore may ignore the sector information if the occupied sector points in an illegal direction FIG. 6C is a schematic sketch showing another exemplary embodiment of a single modulation state with directional deviation sectors, according to some embodiments. As depicted in this non-limiting example, a single modulation state of a modulation scheme is indicated as 635, surrounded by a good modulation zone 636 and a marginal modulation zone 637 which is divided into four sectors 641, 642, 643, 644. As in the previous example, the receiver may receive a faulted message containing at least one marginal-modulation element, and may attempt to recover the message by altering the state assignment of that marginal-modulation element. Initially, the assignment may be altered to an adjacent state in the direction of the sector in which the message element occurs. By making the most likely alterations first, the receiver may thereby find the correct message quickly, saving time and reducing the calculation burden. The receiver may thereby use the sector information present in the marginal-modulation elements of a faulted message as a guide for varying the state assignments of those message elements. If those initial small steps fail to agree with the error-check code, then larger variations may be tested before abandoning the message.

In another embodiment, instead of using categories of modulation quality and sectors in the marginal-modulation zone, the receiver may calculate a direction based on the I and Q amplitude deviations, and may alter a message element with low modulation quality to an adjacent state according to the calculated direction. Basing the initial alteration on the direction of a message element with low modulation quality, relative to the closest state of the modulation scheme, may thereby test the most likely version of the message before attempting a wider search.

Figure 7:
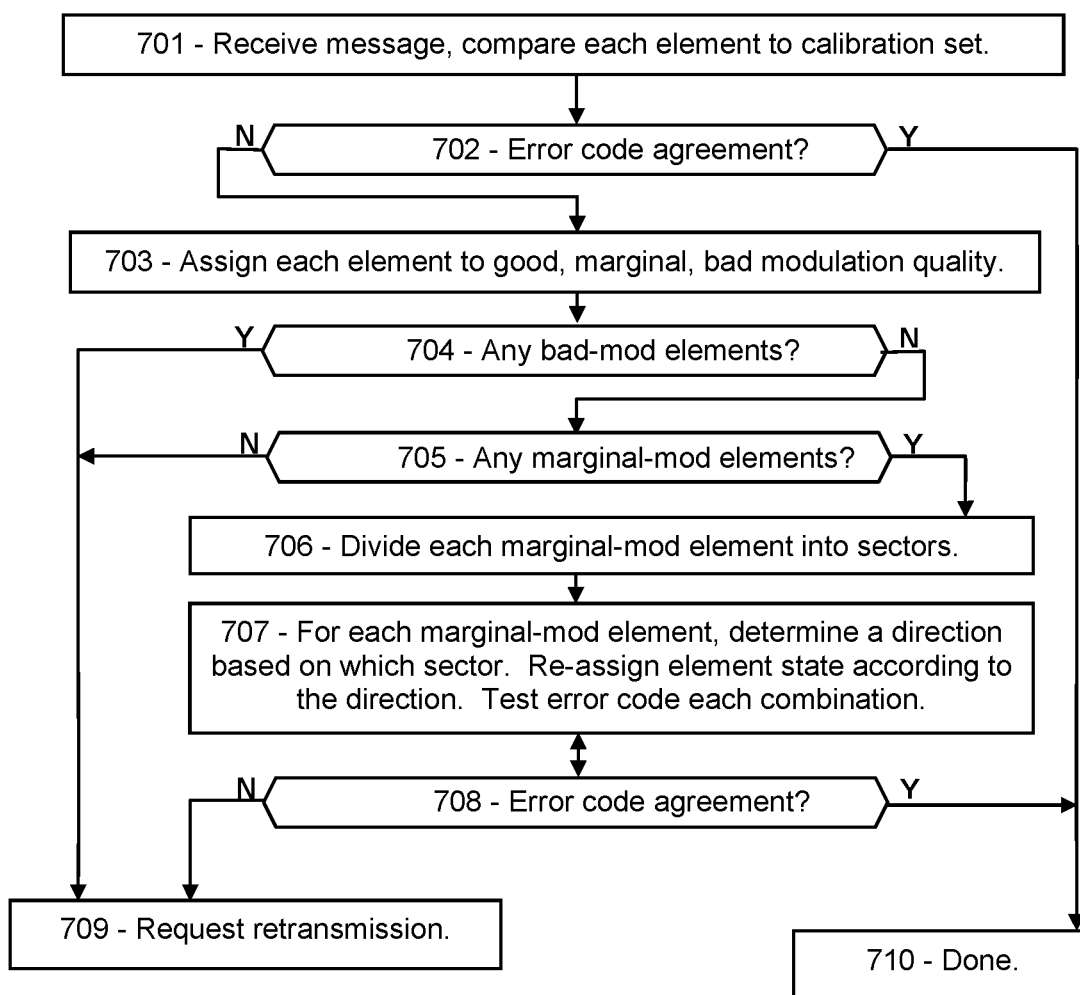
FIG. 7 is a flowchart showing an exemplary embodiment of a process for detecting and correcting message errors according to directional deviation sectors, according to some embodiments.

FIG. 7 is a flowchart showing an exemplary embodiment of a process for detecting and correcting message errors according to directional deviation sectors, according to some embodiments. As depicted in this non-limiting example, a receiver may receive a message at 701, and demodulate each message element using a previously determined calibration set including the branch amplitude levels of the modulation scheme, At 702, the receiver can compare the message to an embedded error-detection code. If the message passes the EDC test, the task is done at 710. If not, at 703 the receiver may allocate each message element to good, marginal, or bad-modulation zones according to the distance from the modulation of the message element to the nearest state, or according to the nearest I and Q amplitude levels. At 704, the receiver determines whether any of the message elements occupies the bad-modulation zone, and if so, the receiver may alter the bad-modulation elements or request a retransmission at 709. If there are no bad-modulation elements, the receiver may determine at 705 whether there are any marginal-modulation elements, in which case the receiver may attempt to recover the message using the sector information. At 706, if not sooner, the receiver may divide each marginal-modulation zone into sectors according to position, and at 707 may determine a direction based on the amplitude deviations of the message element relative to the amplitude levels of the modulation scheme, and may allocate each marginal-modulation message element to one of the sectors. The receiver may then alter each marginal-modulation message element to the adjacent modulation state in the direction indicated by the occupied sector, and may test that variation against the error-detection code. If the altered message passes the error-detection test at 708, the receiver has succeeded in recovering a faulted message and is done. If not, the receiver may request a retransmission and may merge the message with the retransmitted copy, in some embodiments.

In another embodiment, upon receiving a corrupted message, the receiver can calculate a distance value and a direction value according to the modulation of each message element relative to the nearest state of the modulation scheme. To attempt to recover the corrupted message, the receiver can select the message element with the largest distance value, and can alter that message element's state assignment to an adjacent state according to the direction value, and test that altered version against the error-detection code. The receiver can then alter other message element assignments according to their distance values, starting with the largest distance values, and altering each of the message elements to adjacent states according to the direction value. The receiver can perform a nested search among the message elements with distance values exceeding a threshold, for example, testing each such combination. The receiver can begin by altering the message element with the lowest modulation quality, and then proceed to test message elements with successively higher modulation quality. If not successful, the receiver can then alter the message element with the largest distance across all of the states of the modulation scheme, testing each. The receiver can then select further message elements according to distance and vary each according to their direction values or alternatively across the entire modulation scheme, testing each combination. Thus the receiver can select which message elements to alter, and in what order, based on their distance values instead of the good-marginal-bad categories, and the receiver can alter each message element according to the direction value instead of the deviation sectors. In addition, the receiver can calculate how long it will take to perform the alterations, given the number and size of the distance values of the message elements, and can determine whether the amount of time will likely exceed the time required for a retransmission, in which case the receiver may request the retransmission before or concurrently with performing the alterations and tests just described.

Figure 8:
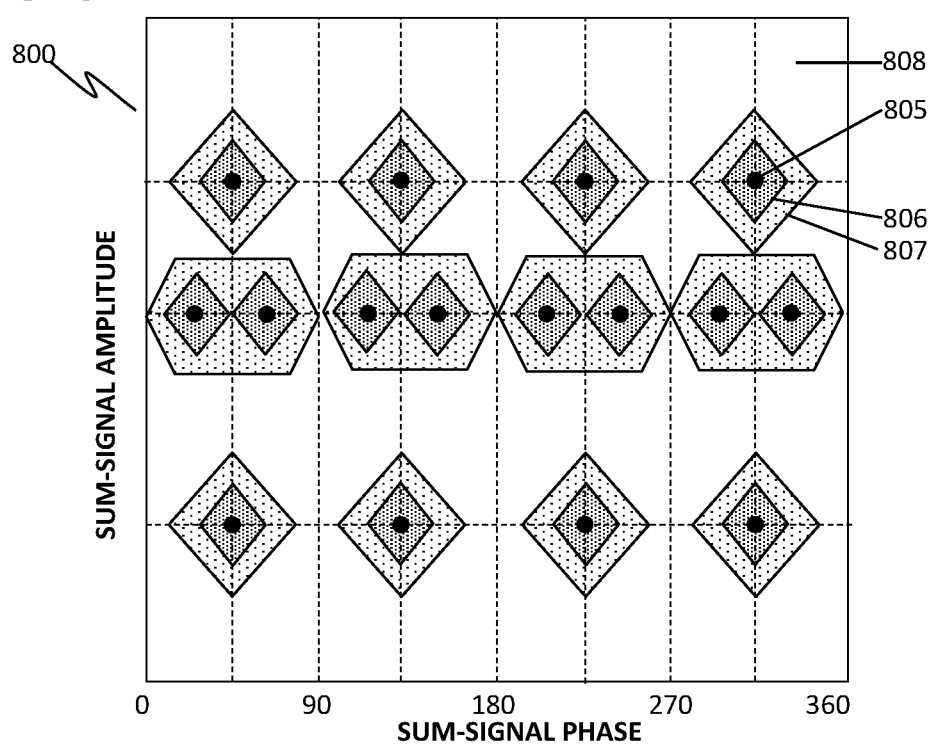
FIG. 8 is a modulation table showing an exemplary embodiment of modulation states and error zones, according to some embodiments.

FIG. 8 is a modulation table showing an exemplary embodiment of modulation states and error zones, according to some embodiments. As depicted in this non-limiting example, a modulation table 800 is an array of modulation states of a modulation scheme, arranged according to a phase and an amplitude of the as-received signal. In the case of a PAM-modulated message, the as-received signal may be the sum-signal, which is equal to the I-branch wave added to the Q-branch wave. In this case, the receiver analyzes the sum-signal without separating the I and Q components. For example, the receiver can analyze the sum-signal for its overall amplitude and phase. Such an analysis corresponds to classical amplitude and phase demodulation. The amplitude and phase of the sum-signal may provide information about noise and interference more readily and/or more precisely than amplitude analysis of the I and Q branches of PAM, in some embodiments.

The depicted modulation scheme in this case is 16QAM, transmitted according to PAM and analyzed according to the amplitude and phase of the sum-signal. Each state is depicted as a dot 805. The non-uniform distribution of states 805 is due to the effects of trigonometrically adding two sinusoidal waves at different phases and amplitudes. Although the position of each state on the modulation table 800 is deterministically determined by the amplitude modulations of the I and Q branches in the ideal case, in practical systems the demodulation results are subject to noise and interference as well as measurement uncertainties. Hence, the sum-signal wave properties, including its amplitude and phase, may provide distinct or at least improved information about which message elements are likely faulted. In some embodiments, each message element may be analyzed by both methods, including amplitude analysis of the separate I and Q branches, and amplitude-phase analysis of the sum-signal before branch separation. Those results may be combined by, for example, allocating a message element to a "suspicious" category if the message element fails a modulation-quality test by either PAM analysis or sum-signal amplitude-phase determination.

In some embodiments, a good-modulation zone 806 and a larger marginal modulation zone 807 may be defined around each state 805 in the modulation table 800, with a bad-modulation zone 808 exterior to the other zones. Message elements in which the sum-signal amplitude and phase occur in the marginal 807 or bad modulation 808 zones may thereby reveal faults that may not be exposed in PAM analysis due to their different sensitivities to interference-induced phase errors, among other differences. In some embodiments, the receiver may test each message element according to the amplitude and phase properties of the sum-signal, then separate the I and Q branches and test each of them for agreement with one of the predetermined branch amplitude levels, and thereby flag a message element as suspicious if the message element appears in the bad or marginal modulation zone according to either the PAM analysis or the amplitude-phase analysis. The receiver may also check that the sum-signal amplitude and phase values are consistent with the PAM state determined from the I and Q branches, and thereby apply yet another independent fault detection test. The receiver may thereby reveal suspicious message elements that may be missed if tested using only a single analysis type.

The examples provided above disclosed methods for evaluating message elements based on the modulation quality. But in real communications, many factors may affect the fault rate and the types of faults likely to occur, and many other types of information may be gleaned from the message elements. For example, the likelihood that a particular message element is at fault may be determined, in part, by the SNR of the signal received because interference or noise is likely to cause the received signal to exhibit variations that can be measured by the receiver. In addition, interference from transmissions in other cells is often time-shifted due to differences in cell time-bases, signal propagation time, etc. In that case, the effects of interference may show up in the modulated signal of each message element in various ways, such as a stepped transition between modulations of adjacent resource elements instead of a sharp transition. Detection of time dispersion may further indicate which message elements are faulted. In addition, if a message is transmitted with a phase-only modulation scheme such as QPSK, then a message symbol with an amplitude different from the other message elements may be suspicious. The receiver may therefore calculate an overall quality factor for each message element, the overall quality factor including some combination of the modulation distance from the nearest state, the SNR, amplitude anomalies, and other measures of message element quality, for example.

Figure 9:
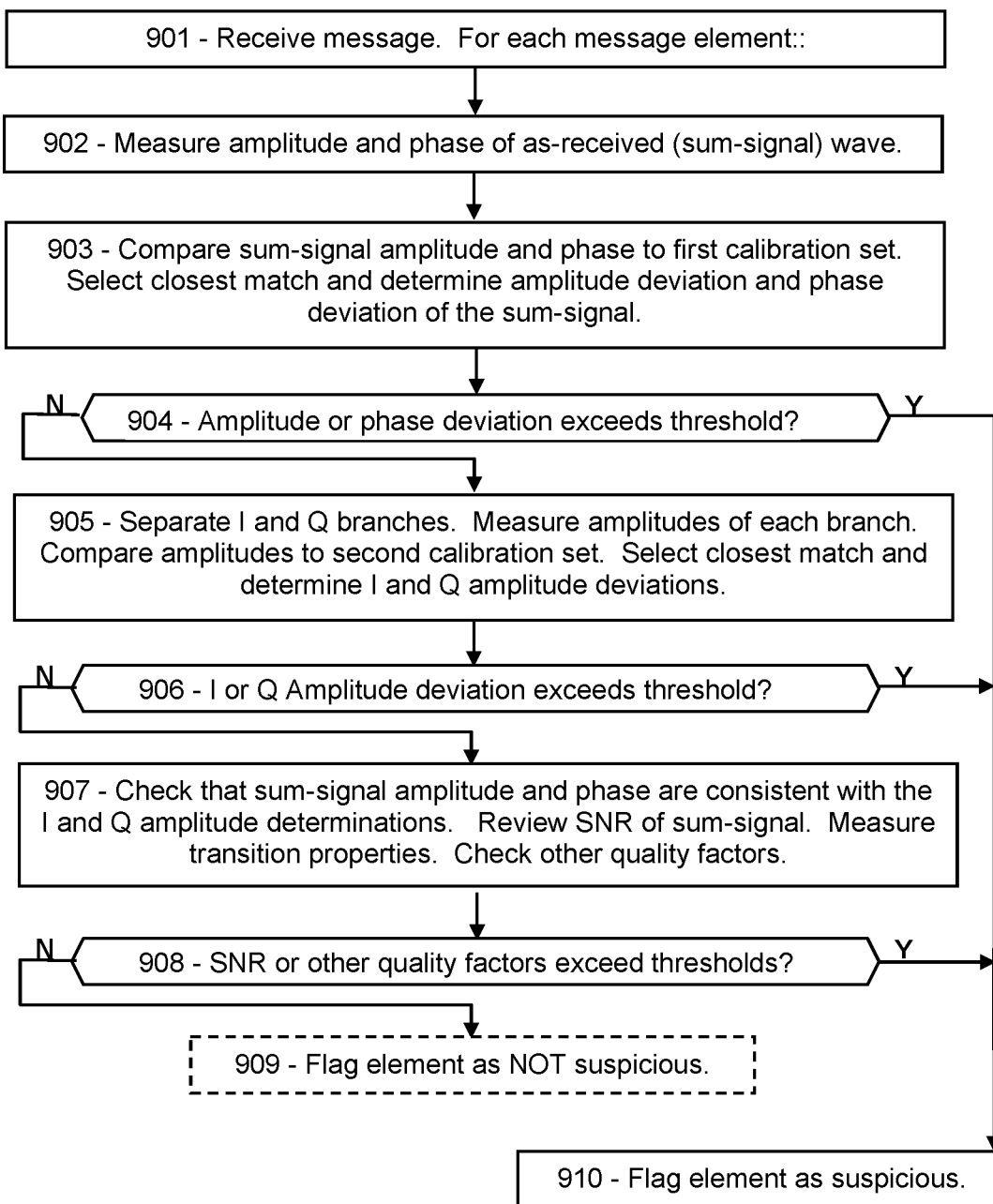
FIG. 9 is a flowchart showing an exemplary embodiment of a procedure for detecting message faults by measuring sum-signal properties, according to some embodiments.

FIG. 9 is a flowchart showing an exemplary embodiment of a procedure for detecting message faults by measuring sum-signal properties, according to some embodiments. As depicted in this non-limiting example, at message faults may be detected by analyzing each received message element from multiple viewpoints including PAM analysis of the I and Q branches, classic amplitude and phase measurements of the sum-signal, measurement of the SNR or transition properties between message elements, and other measures of message quality as may be devised.

At 901, a message comprising message elements is received. For each message element, the rest of the flowchart is then implemented. At 902, the amplitude and phase of the as-received sum-signal are measured and, at 903, compared to a first calibration set that includes the expected amplitude and phase levels of the modulation scheme according to a PAM modulation technology. The receiver may further determine an amplitude deviation and a phase deviation of the message element's sum-signal relative to the closest amplitude-phase match in the first calibration set. Then at 904, the receiver can determine whether the amplitude and/or phase deviation of the sum-signal exceeds a predetermined threshold (including optionally separate thresholds for amplitude and phase). In addition, or alternatively, the amplitude and phase deviations may be combined (and optionally normalized) to determine a distance or a modulation quality of the sum-signal relative to the closest state, and thereby determine whether the distance exceeds a threshold. At 904, if the amplitude deviation or phase deviation of the sum-signal, or other combination, exceeds a predetermined threshold, then at 910 the message element is flagged as "suspicious", although it may be assigned to the nearest state of the modulation scheme anyway.

At 905, the receiver may separate the I and Q branches, then measure the branch amplitudes and compare to a second calibration set that includes the amplitude levels of PAM, including positive and negative levels, as determined from a prior demodulation reference, for example. The receiver may then select the closest match in the second calibration set, and thereby measure the I and Q amplitude deviations of the message element relative to that closest state. At 906, the receiver may determine whether the I or Q amplitude deviations, or both, exceed a threshold, and if so, flag the message element as suspicious at 910.

At 907, the receiver may check whether the amplitude and phase values determined for the sum-signal are in fact consistent with the PAM state implied by the branch-amplitude values for the I and Q branches. The receiver may also measure the SNR of the sum-signal during the symbol-time of the message element. The receiver may measure the transition properties of the sum-signal in switching between the preceding and/or the succeeding message element. The receiver may further determine other parameters related to the modulation quality or likely fault status of the message element. At 908, the receiver may determine whether the SNR or transition properties or other factors exceed their relevant thresholds, and if so, flag the message element as suspicious.

At 909, if the message element passes all of the above tests, the receiver may optionally (in dash) flag the message element as not suspicious. Alternatively, the receiver may simply move on to the next message element without recording anything about the successful message element, since non-faulted may be the default status of most message elements, absent evidence to the contrary.

By performing quality tests on message elements based on PAM amplitudes as well as sum-signal amplitude and phase properties, the receiver may thereby reveal likely faulted message elements that may be difficult to detect using just one of the demodulation technologies. By further including other quality factors such as SNR and transition parameters in the analysis, an improved determination of which message elements are likely faulted and which are likely non-faulted may become feasible. Then, if the number of suspicious message elements is within a practical limit, the receiver may alter each of the suspicious message elements according to their nearest neighbors, optionally with directional assistance, and test each such alteration against the error-detection code, and thereby rescue a faulted message while avoiding the delays and costs involved in seeking a retransmission.

The following examples disclose selecting a message portion that includes faulted message elements, and requesting a retransmission of just the faulted portion.

Figure 10A:
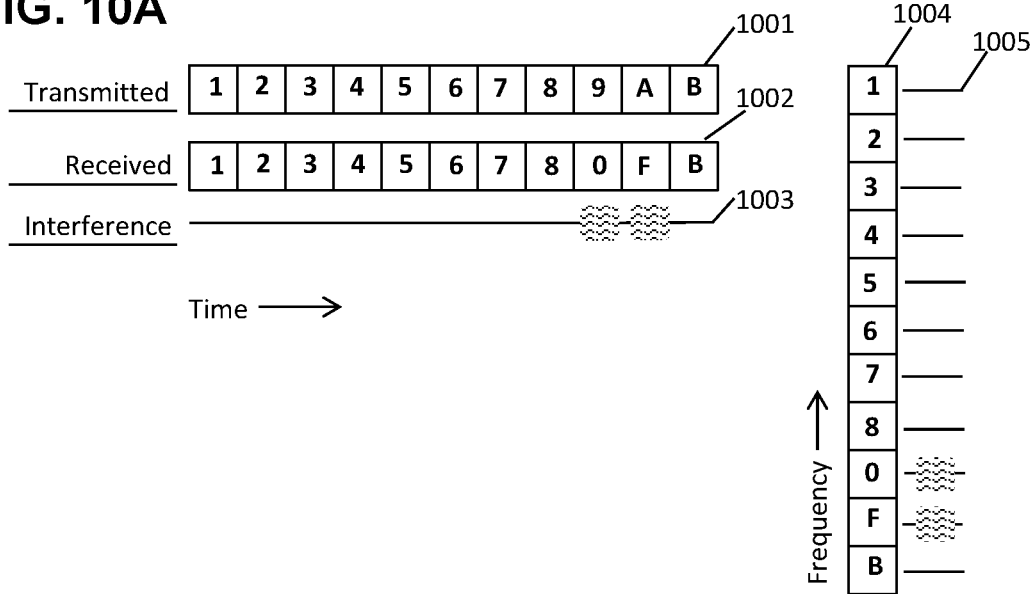
FIG. 10A is a schematic showing an exemplary embodiment of a procedure for selecting a portion of a message to retransmit, and merging the original message with the retransmitted portion, according to some embodiments.

FIG. 10A is a schematic showing an exemplary embodiment of messages with interference faults, according to some embodiments. As depicted in this non-limiting example, the originally transmitted message is shown, and the same message as-received with specific faults, and a plot of the interference. A first message 1001 is transmitted time-spanning, that is, occupying successive symbol times at a single frequency. Each message element is modulated according to a hexadecimal character in 16QAM. The original message is "123456789AB" as shown. The received message 1002 includes two message elements changed or faulted by interference. The interference 1003 is shown as a function of time, with wavy lines indicating interference when present. The received message 1002 indicates that the "9" in the transmitted message 1001 has been changed to a "0" by the interference 1003, and the "A" has been changed to a "F".

Also shown is another message 1004, in this case frequency-spanning, that is, occupying successive subcarriers at a single symbol time. Again, two of the message elements have been changed by interference to different values. Also shown is the frequency-dependent interference 1005 by wavy lines opposite to the subcarriers that the interference affects. Depending on the specific modulation table involved, the interference 1003 or 1005 may have caused an amplitude change or a phase change or both, resulting in the incorrect demodulation of the affected message elements and hence a corrupted message. The task of the systems and methods disclosed herein may be to identify which message elements have been changed, and if possible to determine the original values of the changed message elements.

Figure 10B:
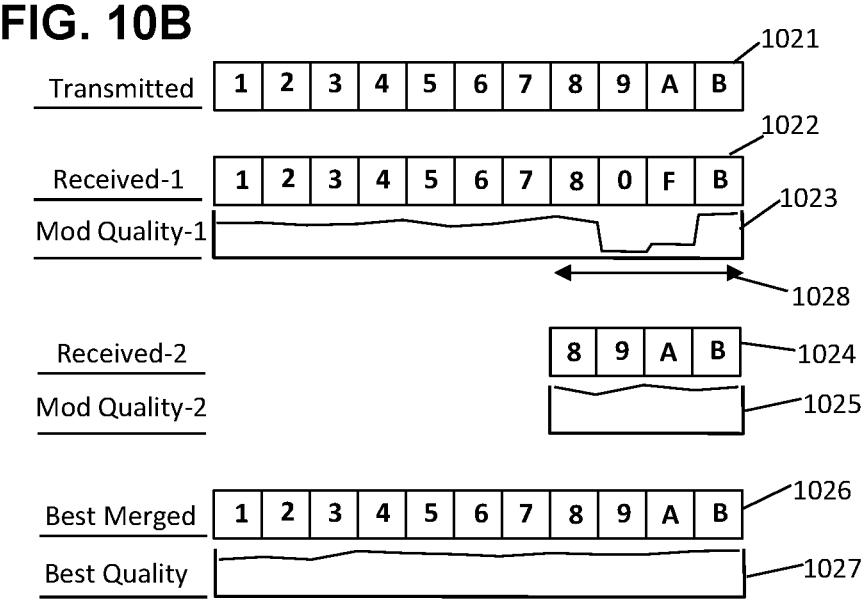
FIG. 10B is a schematic showing an exemplary embodiment of a procedure for merging messages with interference faults, according to some embodiments.

FIG. 10B is a schematic showing an exemplary embodiment of a procedure for selecting a portion of a message to retransmit, and merging the original message with the retransmitted portion, according to some embodiments. As depicted in this non-limiting example, an original message 1021 ("Transmitted") is shown time-spanning, and the as-received version 1022 ("Received-1") includes two incorrect characters due to noise or interference. In addition, the receiver has measured the modulation quality of each message element. For example, the modulation quality may be based on the difference between the branch amplitude values of the message element and the closest predetermined amplitude levels of the modulation scheme. Alternatively, the modulation quality may be inversely related to the distance from the message element to the nearest state of the modulation scheme. For example, larger differences may indicate lower modulation quality. Faulted message elements are likely to have poor modulation quality, due to the random distortions caused by the interference. The line chart 1023 ("Mod Quality-1") shows the modulation quality versus time, determined by the receiver while the message elements are received. All of the message elements have high modulation quality except the ninth and tenth, which have low modulation quality due to the distortion effects of interference when those message elements were received.

The receiver can determine that the received message 1022 is corrupted using an appended or embedded error-detection code (not shown). According to the modulation quality 1023, the receiver has determined that all of the likely faulted message elements are in the last portion, which is indicated by an arrow 1028. The receiver has therefore requested a retransmission of that portion 1028 of the message, consisting of the last four message elements in this case, since that portion 1028 includes all of the message elements with low modulation quality. The receiver then received the requested portion 1028 retransmitted, as shown as 1024 ("Received-2"). The receiver measured the modulation quality of that received portion 1024 which is shown as "Mod Quality-2", labeled 1025. All four of the retransmitted message elements have high modulation quality.

To recover the original message, the receiver can merge the retransmitted message portion 1024 with the first received version 1022, selecting the message elements with the best modulation quality for the merged message. The merged message 1026 is shown as "Best Merged", obtained by selecting whichever of the message elements of the first and second copy had the higher modulation quality. In this case, each of the faulted message elements in the Received-1 message 1022 are not faulted in the Received-2 portion 1024, as indicated by the modulation quality 1027 ("Best Quality"). By preparing the merged message from the better-quality version for each message element, all of the faults have been removed in the merged message 1026. Therefore the merged message 1026 is correct and passes the error-detection test.

Although unlikely, it is possible that the first message and the retransmitted portion may both be faulted in the same message element position, in which case the merged message will also be faulted. In that case, the receiver can try various procedures. For example, the receiver can find the "inconsistent" message elements, which are message elements that differ in the first-received version and the retransmitted portion. Inconsistent message elements indicate that noise distortions occurred in one or both of the versions. It is unlikely that random noise would distort the same message element in the same way on two successive transmissions, and therefore the "consistent" message elements (same in both versions) may be trusted. To mitigate such a continuing fault, the receiver may alter each inconsistent message element by changing its assignment to a different state of the modulation scheme, and test the altered version against the error-detection code. It may be necessary to vary the inconsistent message element across all of the states of the modulation scheme. If there are more than one inconsistent message elements, the receiver may vary them in all combinations, sometimes called a "nested search", and test each combination with the error-detection code. The receiver may have a predetermined limit, the "search limit", such that if the number of inconsistent (or otherwise suspicious) message elements is smaller than the search limit, a nested search may take less time than waiting for another retransmission, and if the number exceeds the search limit, another retransmission request may be the preferred strategy.

If the merged message fails the EDC test, the receiver may select which message elements to alter according to a criterion. The criterion may include whether each message element is inconsistent, as just described. The criterion may additionally or alternatively include the modulation quality of each message element, a low modulation quality indicating probable noise effects. The modulation quality may be a value, such as the branch amplitude deviation of the message element relative to the nearest predetermined amplitude level of the modulation scheme, or the distance from the message element's modulation to the nearest state of the modulation scheme, for example. The criterion may include analyzing the as-received sum-signal (the I and Q branches added together, or the as-received signal before segregation of the two branches). For example, the amplitude and phase of the sum-signal may be determined, and may be compared to predetermined overall amplitude and phase values of the modulation scheme, to uncover further possible faults. Alternatively, the modulation quality may be a category, such as good-mod, bad-mod, and marginal-mod categories, for example. The criterion may further include the SNR of the received signal during each message element, since low SNR may indicate noise or interference presence. The criterion may include anomalous changes in amplitude, such as an amplitude variation in message elements modulated according to a phase-only scheme such as BPSK or QPSK, for example. As a further test, the receiver can measure properties of the transitions between message elements, such as measuring how quickly the amplitude or phase of the message changes between message elements. If interference is present, and the timing of the interfering transmitter is different from the timing of the message transmitter, then the transitions may exhibit a step-like or distributed change in signal properties (such as the amplitude or phase), due to the two signal sources transitioning at different times. A further test may be the flatness of the amplitude or phase of the sum-signal during each message element, since interference can cause time-dependent variations in the received signal. A message element exhibiting low modulation quality, low signal to noise ratio, stepped edges, and non-flat amplitude or phase may be more likely faulted than another message element with good-modulation quality, high SNR, sharp edges, and flat (uniform) signal properties during the message element.

The receiver may include an algorithm that takes, as input, the amplitude and phase deviations of the message element relative to the closest amplitude and phase levels of the modulation scheme, and/or the distance of the message element modulation from the nearest state of the modulation scheme, and/or the SNR of the message element's signal, and/or anomalous variations in amplitude when none are expected, and/or the sharpness of the transitions, and/or the flatness of the signal, and/or environmental factors such as the current noise and interference levels, and/or the signal strength of the message, among other inputs. The algorithm may then provide, as output, a quality factor of each message element, such that a low quality factor renders the message element suspicious. The algorithm may be developed using artificial intelligence and/or machine learning, in some embodiments.

It may be noted that prior art methods for merging messages generally do not measure or use the modulation quality in determining the values of the merged message elements. Instead, the prior art procedures, such as "soft-combining" and related methods, generally involve averaging the raw amplitude (and in some cases the phase values) of the received message elements, or the modulation states they represent, and optionally weighted according to the SNR observed for each message element. However, the SNR by itself is a poor discriminant for message faulting, because the SNR is generally measured as a variation of the received signal during the symbol time and may be highly variable. Furthermore, the statistical improvement obtained by blind averaging is at most $\sqrt{N}$, where N is the number of copies being averaged, and even this modest improvement is generally obtained only when the distortions are random and Gaussian. For common cases in which the distortions are caused by bursty and frequency-rich interference, averaging additional copies can actually increase the errors in the merged message by adding new distortions to the message elements that were originally undistorted. The disclosed procedure avoids these problems by avoiding the averaging step altogether. Instead, the disclosed methods include selecting the best message elements from the two copies according to their quality factor, which may include the SNR as well as the modulation quality, but without averaging multiple received signals. Since a correctly-received message element is more likely to have a high modulation quality, the improvement tends to be proportional to N, instead of √N. Embodiments of the disclosed procedure, for exploiting the modulation quality to select message elements for the merged message, can therefore provide a significant reliability improvement over soft-combining and the other signal-averaging methods, especially in high-background environments or when reception is weak, according to some embodiments.

Figure 11:
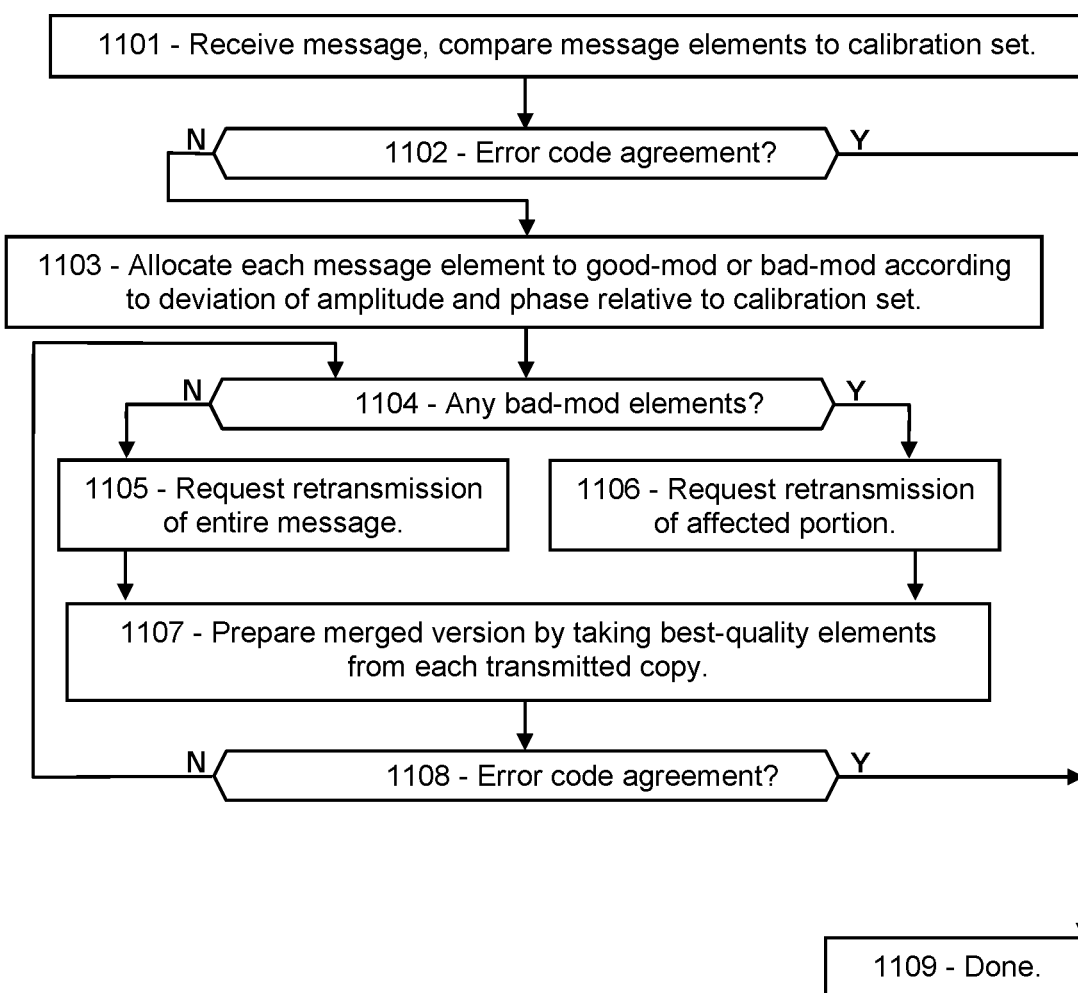
FIG. 11 is a flowchart showing an exemplary embodiment of a process for selecting a portion of a message is to be retransmitted, according to some embodiments.

FIG. 11 is a flowchart showing an exemplary embodiment of a procedure for selecting a portion of a message to be retransmitted, according to some embodiments. As depicted in this non-limiting example, at 1101 a receiver receives a message and compares the I and Q branch amplitude values of each message element to a calibration set that includes the predetermined amplitude levels of the modulation scheme. At 1102, the receiver compares the demodulated message to an embedded error-detection code and, if it agrees, the task is done at 1109. If not, the receiver may evaluate the modulation quality of each message element at 1103, categorizing each message element as good-modulation or bad-modulation according to a difference between the modulation of the message element and the nearest state of the modulation scheme. For example, the receiver can determine an I-branch amplitude deviation between the message element's I-branch amplitude and the closest predetermined amplitude level of the modulation scheme, and likewise a Q-branch amplitude deviation. The receiver may combine those two deviations, such as adding them in magnitude, or calculating a distance according to the square root of the sum of the squares of the deviations, among other combinations.

At 1104, the receiver can determine whether the message includes any bad-modulation elements (or equivalently, whether any of the message elements has a deviation distance greater than a threshold, or other criterion based on the message element's modulation). If there are no bad-modulation elements, the receiver may request a retransmission of the entire message at 1105. If, however, the message includes one or more bad-modulation elements at 1104, then the receiver may determine whether the faults occupy just a portion of the message, and may request a retransmission of that portion at 1106. In either case, at 1107 the receiver can merge the first-received message with the retransmitted message or portion, taking from each version the message element with better modulation quality. The receiver can then test the merged message against the error-detection code at 1108, and if it agrees, the task is done. If not, the receiver can return to interrogator 1104 and again determine whether there are still any bad-modulation elements. The receiver may continue that cycle until the message passes the EDC test. However, not shown, if the receiver runs out of retransmission opportunities, it may abandon the message.

Figure 12:
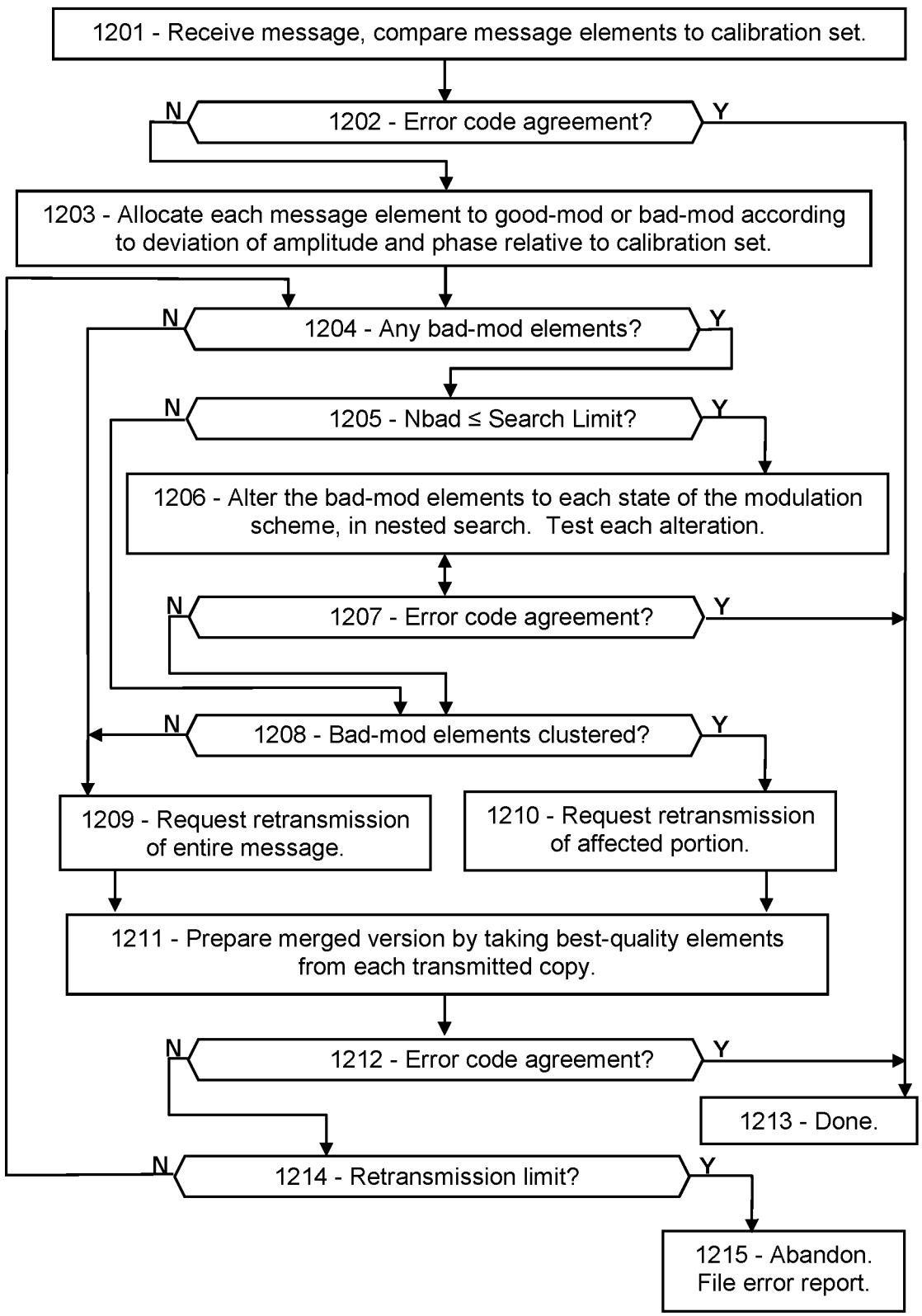
FIG. 12 is a flowchart showing another exemplary embodiment of a process for selecting a portion of a message is to be retransmitted, according to some embodiments.

FIG. 12 is a flowchart showing another exemplary embodiment of a process for selecting a portion of a message is to be retransmitted, according to some embodiments. As depicted in this non-limiting example, a receiver can process and mitigate message faults as described in the previous figure, but with more options and details. At 1201, the receiver receives the message and demodulates it using the calibration set of amplitude and phase levels, then checks the error-detection code at 1202. If agreed, the task is done at 1213. If not, at 1203 the receiver can analyze each message element's amplitude and phase deviations relative to the closest amplitude and phase levels of the modulation scheme, and allocate each message element to good-modulation or bad-modulation accordingly. At 1204, the receiver determines whether there are any bad-modulation message elements, and if not, can request a retransmission of the entire message at 1209. If there are bad-modulation elements, then at 1205 the receiver can count them and determine whether the number of bad-modulation elements exceeds a search limit, corresponding to the maximum number of message elements that the receiver can process simultaneously in attempting to repair the message.

If the number of bad-modulation elements ("Nbad") exceeds the search limit, the receiver can drop to 1208 as explained below. If not, then at 1206 the receiver can attempt to find the correct demodulation values of the bad-modulation message elements in a grid-search procedure. For example, the receiver can alter the assigned modulation state of the bad-modulation message elements, and test the error-detection code for each such alteration. If there is only one bad-modulation message element, the receiver can alter its I-branch and Q-branch amplitudes across all of the predetermined amplitude levels of the modulation scheme (or equivalently, alter the assigned state of the message element across all of the states of the modulation scheme), testing each alteration, until finding the correct value. If there are multiple bad-modulation elements, then the receiver can alter them all in a "nested search" configured to test all combinations of all bad-modulation elements in all of the states of the modulation scheme. Each alteration is then tested at 1207, and the search is aborted if any one of the alterations passes the EDC test. The double-ended arrow indicates that the two steps 1206-1207 are to be performed repeatedly until all combinations are exhausted or one of them passes the test.

If none of the alterations passes the test, or if the number of bad-modulation elements exceeds the search limit at 1205, then at 1208 the receiver can determine whether the bad-modulation elements are clustered in just a portion of the message or are distributed throughout the message. If the bad-modulation elements are not clustered, then at 1209 the receiver can request a retransmission of the entire message. If they are clustered in a portion of the message, then at 1210 the receiver can request a retransmission of that portion. In either case, at 1211 the receiver can prepare a merged message version by selecting, from the first-received message and the retransmitted message or portion, whichever message element has a better modulation quality. The modulation quality may be a category such as good-modulation or bad-modulation, or it may be a value such as the sum of the magnitudes of the amplitude deviations of the message element, or a square-root of the sum of the squares of the amplitude deviations, or a distance of the message element's modulation from that of the nearest state of the modulation scheme, for example.

The receiver may then, at 1212, test the merged message and, if it agrees with the error-detection code, the task is done. If not, then at 1214 the receiver can determine whether it has reached its retransmission limit, the maximum number of times that the receiver can request a retransmission of the same message. If not, then the receiver can return to 1204 and perform a similar mitigation attempt using the merged message. If the receiver has exhausted its retransmission limit, then at 1215, the receiver may abandon the message and optionally file an error report, such as a message indicating that the reception conditions are insufficient for reliable communications, for example.

The examples provided above disclosed methods for evaluating message elements based on the modulation quality. But in real communications, many factors may affect the fault rate and the types of faults likely to occur, and many other types of information may be gleaned from the message elements. For example, the likelihood that a particular message element is at fault may be determined, in part, by the SNR of the signal received because interference or noise is likely to cause the received signal to exhibit variations that can be measured by the receiver. In addition, interference from transmissions in other cells is often time-shifted due to differences in cell time-bases, signal propagation time, etc. In that case, the effects of interference may show up in the modulated signal of each message element in various ways. Detection of such time dispersion may further indicate which message elements are faulted. In addition, if a message is transmitted with a phase-only modulation scheme such as QPSK, then a message symbol with an amplitude different from the other message elements may be suspicious. The receiver may therefore calculate an overall quality factor for each message element, the overall quality factor including some combination of the modulation distance from the nearest state, the SNR, amplitude anomalies, and other measures of message element quality, for example.

The systems and methods also include procedures for a receiver to indicate which portion of a subject message should be retransmitted. Prior art includes retransmitting the entire message, which may be wasteful if the faulted message elements are clustered in just a small fraction of the message. For example, upon receiving a corrupted message, a receiver can transmit a short message or message-fragment termed a "retransmit portion indicator", configured to indicate which portion of the message is to be retransmitted. The retransmit portion indicator may be a separate stand-alone message, or it may be a field appended to a NACK or other message, among other configurations. The retransmit portion indicator may thereby save time and resources by avoiding retransmission of the whole message if only a portion is required. However, if the problematic elements are distributed throughout the message, then the retransmit portion indicator can indicate that the whole message is to be retransmitted, in some embodiments. In other embodiments, a NACK with no retransmit portion indicator at all may prompt a retransmission of the entire message by default.

In some cases, a user device may not desire a retransmission, and may indicate so using the retransmit portion indicator. For example, a user device may have decided to abandon a message after multiple failed attempts at demodulating it, and may transmit a NACK to the base station. Normally, the base station responds to the NACK by again transmitting the message, but in this case that would be wasteful. Therefore, the retransmit portion indicator may be configured to indicate that no retransmission is requested, thereby saving resources. In addition, the base station may record a network failure when a user indicates such an abandonment. The network may subsequently analyze such events to diagnose communication problems.

In 5G/6G, acknowledgements are generally configured as standard length-12 messages modulated in a peculiar 12-phase, single-amplitude modulation scheme, which is termed "12PSK" herein. If the message uses PAM modulation, the phase referred to is the phase of the sum-signal. The acknowledgement message is generally one of the DMRS (demodulation reference signal) codes, but phase-shifted by one of 12 phases. The phase shift thereby encodes three multiplexed items: acknowledgement or non-acknowledgement of a first message, acknowledgement or non-acknowledgement of an optional second message, and an optional scheduling request in the case of uplink.

To indicate that only a portion of a message should be retransmitted, the systems and methods include appending, to the acknowledgement message, a field indicating which portion of the subject message is to be retransmitted. For compatibility, the retransmit portion indicator may be modulated in 12PSK, same as the acknowledgement indicator. Such an acknowledgement message, referring to two prior messages, may therefore include two ACK responses, one ACK and one NACK, or two NACK responses. If the acknowledgement includes one ACK and one NACK, then clearly the appended retransmit portion indicator applies to whichever of the acknowledged messages is a NACK. However, if both of the acknowledged messages are NACKs, then the retransmit portion indicator may apply to the first NACK only, and the other message is retransmitted in entirety. As a further option, if both acknowledgement are NACKs, then two retransmit portion indicator codes may be appended to the acknowledgement message, thereby indicating which portions of each faulted message is to be retransmitted.

If the retransmit portion indicator is modulated in 12PSK, the retransmit portion indicator has 12 modulation states (12 phases) and therefore can indicate any one of 12 different requests. For example, each modulation state of the retransmit portion indicator may indicate a different portion of the message that contains faults. On receiving the retransmit request, and the transmitter can retransmit that requested portion. In one version, the receiver may divide the subject message into 12 portions, and may indicate which of the one-twelfth portion is to be retransmitted. Alternatively, the twelve available states may be configured so that one of the states requests that the whole message be retransmitted instead of just a portion, such as when the message includes faults throughout the message. In addition, another modulation state may be used to request no retransmission at all, as in the case where the message is being abandoned. Optionally, one or two additional modulation states may be reserved for future uses, and the remaining modulation states may indicate which portion of the message is to be retransmitted.

Following are examples of a retransmit portion indicator based on the 12PSK modulation.

Figure 13A:
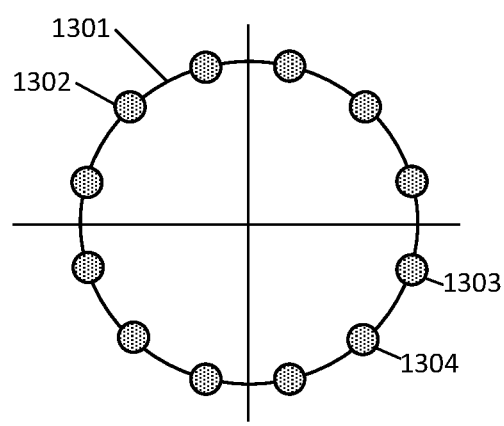
FIG. 13A is a schematic showing an exemplary embodiment of a phase chart for indicating which portion of a message is to be retransmitted, according to some embodiments.

FIG. 13A is a schematic showing an exemplary embodiment of a phase chart for acknowledgement multiplexing with 12PSK, according to some embodiments. A phase chart is a polar plot of the modulation states of a modulation scheme, with the amplitude levels shown as large circles. The radius of the large circle indicates the sum-signal amplitude of the modulation scheme. The phase levels are indicated by the angles of modulation states, relative to the horizontal axis. On the chart, each modulation state is represented by a stippled icon. In 12PSK there is only one amplitude (of the sum-signal), and it is represented by a single circle 1301. The modulation states are shown as stippled icons 1302 placed at 30-degree intervals around the amplitude circle 1301. Each modulation state 1302 may indicate which section of the message contains problematic elements. Upon receiving such a retransmit portion indicator, the indicated portion of the message can be retransmitted instead of the whole message, saving time and resources.

In some embodiments, a particular modulation state (in this case, the highest phase modulation state 1303) may indicate that the entire message is to be retransmitted instead of just one portion. Another modulation state (in this case, 1304) may indicate that no retransmission is desired responsive to the NACK. To be clear, the indicated modulation states 1302 in a phase chart are modulation states, not bits; therefore each retransmit portion indicator includes one and only one of the states shown.

Figure 13B:
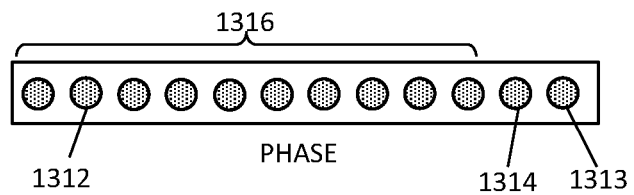
FIG. 13B is a schematic showing an exemplary embodiment of a modulation table for indicating which portion of a message is to be retransmitted, according to some embodiments.

FIG. 13B is a schematic showing an exemplary embodiment of a modulation table for 12PSK, according to some embodiments. This figure displays the same information as the previous figure, but now in the form of a modulation table with the phase of the sum-signal shown horizontally and the sum-signal amplitude vertically. As depicted in this non-limiting example, the twelve sum-signal modulation states of 12PSK include phases separated by a 30-degree phase step, at a constant amplitude, thus making twelve phase levels and only one amplitude level. Each modulation state is shown as a stippled icon 1312 at a different phase modulation. If a receiver receives a message that disagrees with its included error-detection code, and the message contains one or more elements with low modulation quality, then the depicted retransmit portion indicator may instruct the transmitting entity to retransmit the indicated portion of the message.

For example, the receiver may receive a message and determine whether the message agrees with its error-detection code, and if so, it transmits an ACK and is done. If the message does not agree with its error-detection code, the receiver may determine the modulation quality of each message element. The receiver may divide the subject message into a number of portions, and may determine in which portion each suspicious element is located. If all of the suspicious elements are located in one of the portions, the receiver may append the retransmit portion indicator, as a single 12PSK resource element, to the 5G acknowledgement message, and may thereby instruct the transmitting entity to retransmit only the portion containing errors.

In some embodiments, the retransmit portion indicator may be configured to indicate ten portions of the message, one portion represented by each of the first ten phase modulation states in 12PSK. The last two phase modulation states are used to request a retransmission of the message in entirety (phase 1313) or to request that no retransmission occur at all (phase 1314). The other ten modulation states 1316 indicate which one-tenth portion of the message contains the problematic elements, so the transmitter can retransmit just that portion of the message. The receiver and the transmitter may have previously agreed as to the format and meaning of the various states of the retransmit portion indicator, via convention for example.

Figure 13C:
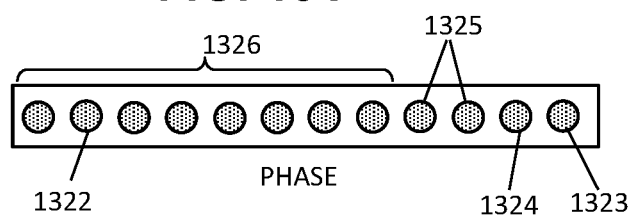
FIG. 13C is a schematic showing an exemplary embodiment of another modulation table for indicating which portion of a message is to be retransmitted, according to some embodiments.

FIG. 13C is a schematic showing another exemplary embodiment of a modulation table for 12PSK, according to some embodiments. As depicted in this non-limiting example, a receiver may receive a message and determine where the problematic elements are located. The receiver may transmit a retransmit portion indicator to the transmitting entity in place of an acknowledgement, or it may append a retransmit portion indicator to an acknowledgement message, in either case directing the transmitter to take an action. The retransmit portion indicator may be modulated according to the depicted modulation table in 12PSK. In the depicted example, the twelve modulation states 1322 include one modulation state 1323 configured to indicate that the full message is to be retransmitted, another modulation state 1324 indicating that no retransmission is needed, two other modulation states 1325 reserved for future uses, and eight remaining modulation states 1326 indicating which portion, of eight portions of the message, should be retransmitted.

Figure 13D:
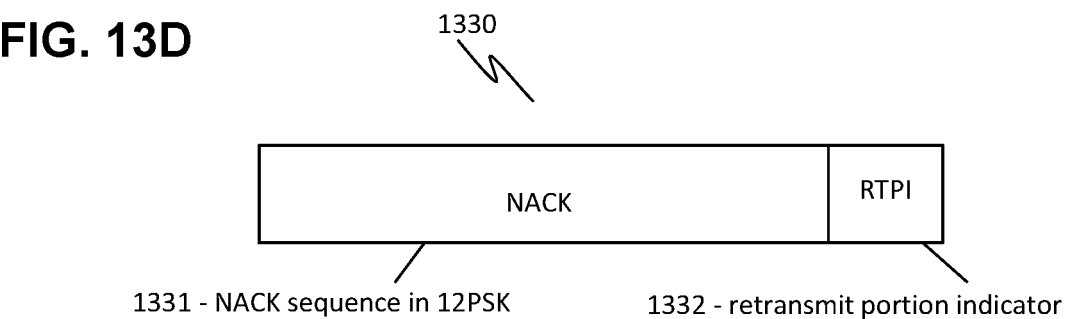
FIG. 13D is a schematic showing an exemplary embodiment of a message for indicating which portion of a message is to be retransmitted, according to some embodiments.

FIG. 13D is a schematic showing an exemplary embodiment of a message 1330 including an acknowledgement and a retransmit portion indicator, according to some embodiments. As depicted in this non-limiting example, a 5G/6G acknowledgement message 1331, configured to express negative acknowledgement or NACK in this case, is provided. Appended to the negative acknowledgement message 1331 is a retransmit portion indicator 1332 ("RTPI"). The acknowledgement portion 1331 and the RTPI 1332 are modulated in 12PSK. The retransmit portion indicator 1332 may be a single modulated resource element in 12PSK, in some embodiments. The retransmit portion indicator 1332 may be configured to indicate, to a transmitting entity, whether to retransmit the entire message, or no retransmission, or just one specified portion, according to the modulation state of the retransmit portion indicator 1332. The originating entity, upon receiving the depicted acknowledgement message including the retransmit portion indicator 1332, may then perform the requested action, such as retransmitting a particular portion of the message. The receiver and the transmitter may have already agreed as to how the retransmit portion indicator is to be interpreted. For example, in a particular embodiment, the message may include integer E message elements, and the retransmit portion indicator may be configured to select one of P different portions of the subject message. Then the various message elements may be distributed among the P portions as follows: (a) calculate an integer $M=E/P$, rounding down; (b) allocate M message elements to each of the first (P−1) portions; (c) allocate all the remaining message elements to the final portion. This procedure is unambiguous, easy to implement, and roughly equalizes the size of each portion. Many other, equivalent ways of determining the portions are possible and envisioned.

The systems and methods further include a shorter and simpler acknowledgement message that includes a retransmit portion indicator, yet is modulated in a standard modulation scheme such as QPSK or 16QAM, as described in the following examples. In contrast to the foregoing examples, in which the retransmit portion indicator is modulated in 12PSK, the following examples disclose retransmit request messages using a standard modulation scheme such as QPSK or 16QAM.

Figure 14A:
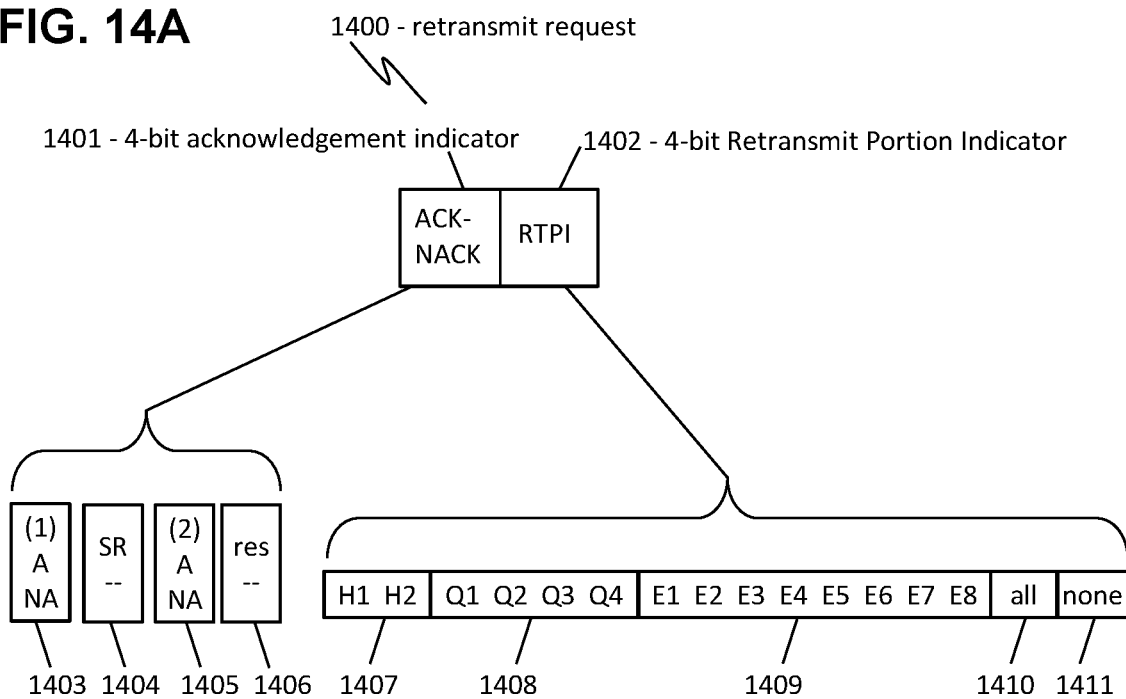
FIG. 14A is a schematic showing an exemplary embodiment of a message including an acknowledgement and an indication of which portion of a message is to be retransmitted, according to some embodiments.

FIG. 14A is a schematic showing an exemplary embodiment of an 8-bit retransmit request message (or simply "retransmit request") configured as an acknowledgement message including a retransmit portion indicator, according to some embodiments. As depicted in this non-limiting example, a retransmit request message 1400 may include a 4-bit portion 1401 providing positive or negative acknowledgement (ACK-NACK) for up to two subject messages as well as an optional scheduling request. The retransmit portion indicator 1402 may also be 4 bits, configured to indicate which portion of the subject message is to be retransmitted. In this example, the acknowledgement field 1401 may include a first bit 1403 indicating whether the first subject message is faulted (ACK-NACK abbreviated as "(1) A NA"), a second bit 1404 indicating whether an optional scheduling request ("SR-") is included, a third bit 1405 indicating whether a second subject message is faulted ("(2) A NA"), and a fourth bit 1406 ("res-") which may be reserved for future uses. Alternatively, the fourth bit 1406 may indicate which subject message the retransmit portion indicator 1402 applies to, in event of an ambiguity, for example.

The 4-bit retransmit portion indicator 1402 may encode 16 modulation states, configured to indicate a request to the transmitting entity. For example, two of the modulation states 1407 may indicate that the transmitting entity is to retransmit the first half (H1) or the second half (H2) of the subject message, in situations where the faults are clustered in the first or second half of the message. Four more modulation states 808 may indicate whether the transmitting entity is to retransmit just a quarter of the subject message, and if so, which quarter. The next eight modulation states 1409 may indicate which eighth portion of the subject message is to be retransmitted, assuming the problematic element(s) is/are in the corresponding one-eighth portion of the subject message. One modulation state 1410 may indicate that the transmitting entity is to retransmit the entire subject message, and another modulation state 1411 may indicate that no retransmission is needed. Thus the 8-bit retransmit request 1400 (four QPSK resource elements or two 16QAM elements) may provide the same information as the length-12 acknowledgement of 5G/6G, including positive and negative acknowledgements to two subject messages, plus an optional scheduling request, plus a reserved bit, plus a detailed and versatile indication of which portion of the subject message is to be retransmitted. This compact code may thereby save time and resources.

Figure 14B:
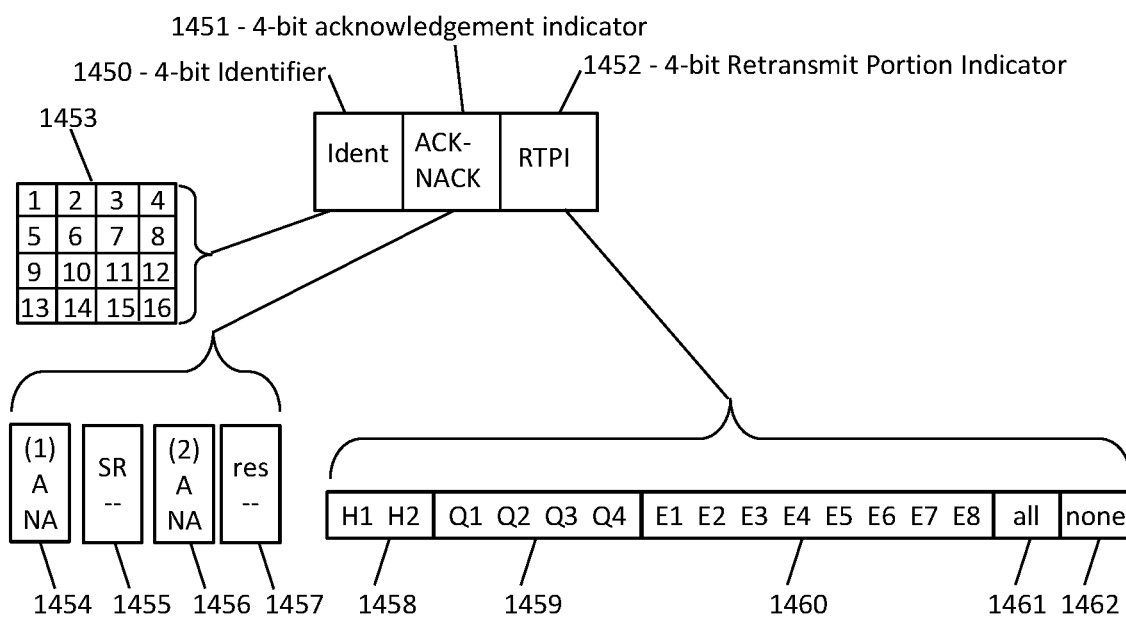
FIG. 14B is a schematic showing another exemplary embodiment of a message including an acknowledgement and an indication of which portion of a message is to be retransmitted, according to some embodiments.

FIG. 14B is a schematic showing an exemplary embodiment of a 12-bit acknowledgement message including an identification section and a retransmit portion indicator, according to some embodiments. As depicted in this non-limiting example, an identifier 1450 is included (prepended in this example) with the acknowledgement indicator 1451. The identifier 1450 is a short code that identifies which message, of several messages in play, is being acknowledged. In this case, the identifier 1450 is a 4-bit code. The 4 bits represent a number in the range of 1-16 or 0-15, matching an identifying code that was previously selected by the entity that transmitted the subject message. The identifying code may be included in the subject message, or otherwise conveyed to the receiver. The purpose of the identifier 1450 is to resolve ambiguities when traffic is heavy and numerous user devices are competing for bandwidth or transmitting acknowledgements. The identifier 1450 thereby identifies which of those active user devices is sending the present acknowledgement, and hence which of the previously transmitted downlink messages is being acknowledged. In this way, the identifier 1450 avoids confusion or misappropriation of the acknowledgement. Four bits may be sufficient because it is unlikely that more than 16 users would be acknowledging in the same time slot and the same resource block. Accordingly, the expanded depiction 1453 of the identifier portion 1450 shows 16 possible codes for 4 bits. The base station, upon matching the identifier code to its previously selected code, then can determine which subject message is being acknowledged.

The acknowledgement indicator 1451 is also 4 bits in this example. The acknowledgement indicator 1451 is shown expanded as 1454, 1455, 1456, 1457. The four bits thereby indicate the ACK-NACK status of two subject messages, an optional scheduling request, and a reserved bit as shown.

The retransmit portion indicator 1452 is also 4 bits, configured to encode 16 modulation states. As shown, the 16 modulation states represent a request for retransmission of a first or second half 1458 ("H1" or "H2") of the subject message, or one of four quarters 1459, or one of eight eighths 1460, plus a modulation state indicating to retransmit the entire subject message 1461, and another modulation state 1462 for suppressing the retransmission.

The systems and methods disclosed herein further include short-form acknowledgement messages. These are very brief. Each acknowledgement is configured to acknowledge just one subject message (the most common situation) and optionally to submit a scheduling request or a retransmit portion indicator, as shown in the following examples.

Figure 15A:
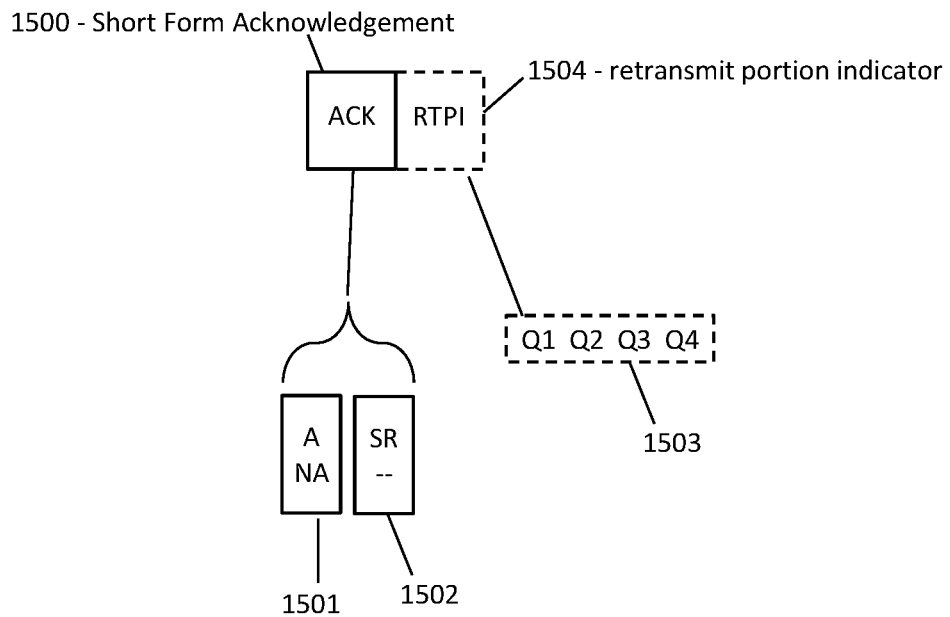
FIG. 15A is a schematic showing another exemplary embodiment of a message including an acknowledgement and an indication of which portion of a message is to be retransmitted, according to some embodiments.

FIG. 15A is a schematic showing an exemplary embodiment of a short form acknowledgement message of length one QPSK resource element, according to some embodiments. As depicted in this non-limiting example, the short form acknowledgement message 1500 includes two modulated bits in a single QPSK element, plus options. The first bit 1501 indicates whether the subject message is a positive or negative acknowledgement (represented symbolically as "A NA"), and the second bit 1502 indicates whether an SR scheduling request is desired. The short form acknowledgement 1500 exploits the fact that most messages are successfully received most of the time, and most acknowledgements pertain to a single subject message. Therefore, the depicted short acknowledgement message 1500 is sufficient for most acknowledgement situations. The brevity of the acknowledgement message (just one resource element) makes it unlikely to collide with other messages, and also saves time and resources.

If, however, the response is a NACK, then an optional retransmit portion indicator 1504 may be included, indicating which portion of the subject message is to be retransmitted. For example, the retransmit portion indicator 1504 may be two bits, thereby indicating which quarter 1503 of the subject message is to be retransmitted. If the acknowledgement 1501 is a NACK and the retransmit portion indicator 1504 is omitted, then the entire subject message is retransmitted by default. Thus the short-form acknowledgement 1500 conveys sufficient information for most messaging situations while occupying such a small resource space (just one QPSK resource element for most cases, or two resource elements for a NACK) that a collision may be unlikely and interference with other cells may be avoided.

Figure 15B:
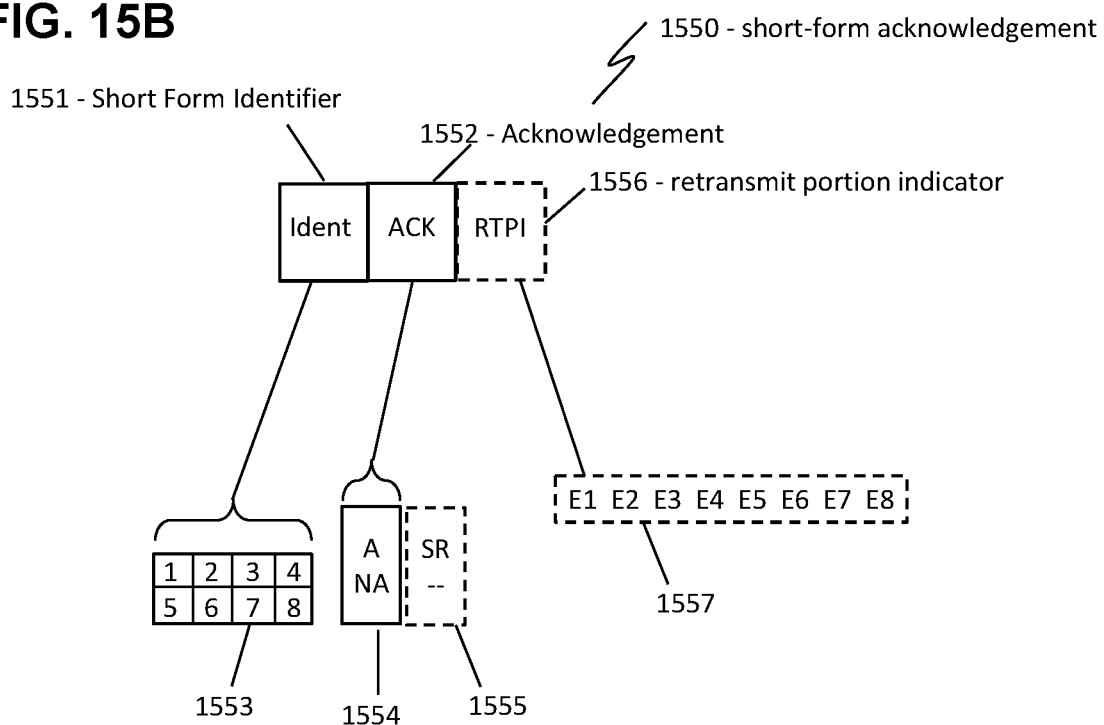
FIG. 15B is a schematic showing yet another exemplary embodiment of a message including an acknowledgement and an indication of which portion of a message is to be retransmitted, according to some embodiments.

FIG. 15B is a schematic showing an exemplary embodiment of a short form acknowledgement message including an identifier portion, according to some embodiments. As depicted in this non-limiting example, a short form acknowledgement message 1550 may include an identification field 1551 and an acknowledgement field 1552. The acknowledgement can indicate which of several concurrent messages is the subject message, according to an identifier 1551, which in this case is a 3-bit field of the retransmit request 1550, the three bits thereby specifying one of eight codes as shown in the detail view 1553. The base station (or other transmitting entity) may have included that same code in the subject message, or may have informed the receiver of its selected code in some other manner. The receiver can indicate which subject message is being responded to, by including the code 1553 in the acknowledgement 1550 as shown. After the identifier field 1551 is a short acknowledgement field 1552, which in this case is just one bit 1554, the fourth bit of the message, thereby indicating whether the response is a positive or negative acknowledgement. The 4-bit short-form acknowledgement message may be conveyed as two resource elements in QPSK or a single resource element in 16QAM, thereby conveying both the acknowledgement status and the identification code of the subject message.

Optionally, in dash, a fifth bit may be included, indicating whether a scheduling request 1555 is needed, as shown appended to the acknowledgement 1554.

Optionally, in dash, a retransmit portion indicator 1556 may be added when the acknowledgement 1554 is a NACK, thereby indicating which portion of the subject message is to be retransmitted. A NACK without the retransmit portion indicator 1556 may indicate that the entire message is to be retransmitted. In the example, the retransmit portion indicator is 3 bits, indicating which eighth 1557 of the subject message is to be retransmitted. With all options included, the total size is 8 bits, which may be encoded in four QPSK elements or two 16QAM elements.

In summary, a receiver can determine that a received message is corrupted, fail to resolve the error by variations, determine that the faults lie in just a portion of the message according to their modulation quality (optionally combined with SNR or other quality factors), and request that the problematic portion be retransmitted instead of the whole message, thereby saving time and resources. A variety of configurations for the retransmit portion indicator are possible, specifying the portion according to various fractional parts of the message, within a compact format. Other formats for the acknowledgement, optionally with a scheduling request or an identifier or a retransmit portion indicator, are also disclosed, many occupying just two or three or four QPSK message elements, and thereby evading interference under most circumstances.

Networks implementing the disclosed procedures, including a retransmit portion indicator, may thereby save time, reduce unnecessary delays, save energy, reduce complexity, conserve resources, avoid generating extra interference to neighboring cells, sharpen and simplify the response to message faults, and improve network operations overall, according to some embodiments.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for mitigating a faulted wireless message, the method comprising:
   a) receiving or determining a threshold;
   b) receiving or determining a plurality of predetermined amplitude levels of a modulation scheme;
   c) receiving the faulted message comprising message elements, each message element comprising a first signal multiplexed with a second signal in quadrature;
   d) for a particular message element, determining a first deviation and a second deviation, wherein the first deviation comprises an amplitude of the first signal minus a closest one of the predetermined amplitude levels of the modulation scheme, and wherein the second deviation comprises an amplitude of the second signal minus a closest one of the predetermined amplitude levels of the modulation scheme;
   e) determining a modulation quality of the particular message element according to the first deviation and the second deviation; and
   f) comparing the modulation quality to the threshold.

2. The method of claim 1, wherein the faulted message is configured according to 5G or 6G technology.

3. The method of claim 1, further comprising:
   a) receiving a demodulation reference comprising reference elements, each reference element comprising two branch signals in quadrature; and
   b) determining, according to amplitudes of the two branch signals, a maximum amplitude level and a minimum amplitude level of the modulation scheme.

4. The method of claim 3, further comprising:
   a) calculating one or more additional levels of the modulation scheme by interpolating between the maximum and minimum amplitude levels of the modulation scheme.

5. The method of claim 1, wherein the modulation quality of each message element is related to either a sum of magnitudes of the first and second deviations, or a sum of squares of the first and second deviations.

6. The method of claim 1, further comprising:
   a) determining a signal-to-noise-ratio (SNR) or a signal-to-interference-and-noise-ratio (SINR) of the particular message element; and
   b) determining the modulation quality of the particular message element, according to a formula that takes, as input, the first deviation, the second deviation, and the SNR or SINR, and provides, as output, the modulation quality.

7. The method of claim 1, further comprising:
   a) determining a faulted portion of the faulted message, the faulted portion including all of the message elements with modulation quality below the threshold; and
   b) requesting a retransmission of the faulted portion.

8. The method of claim 7, further comprising:
   a) receiving a retransmitted portion comprising a retransmission of the faulted portion;
   b) substituting, for each message element of the faulted portion, a corresponding message element of the retransmitted portion; and
   c) determining whether the message, including the retransmitted portion, agrees with an error-detection code associated with the message.

9. The method of claim 7, further comprising:
   a) receiving a retransmitted portion comprising retransmitted message elements of the faulted portion;
   b) for each retransmitted message element, determining a modulation quality according to the first and second amplitude levels of the retransmitted message element;
   c) for each retransmitted message element having a modulation quality higher than the modulation quality of the corresponding message element of the faulted portion, replacing the message element of the faulted portion with the corresponding retransmitted message element; and
   d) determining whether the message, including the replaced message elements, agrees with an error-detection code associated with the message.

10. The method of claim 1, further comprising:
    a) receiving or determining a first threshold and a second threshold;
    b) allocating each message element having a modulation quality below the first threshold to a "faulted" category;
    c) allocating each message element having a modulation quality above the first threshold and below the second threshold to a "suspicious" category;
    d) determining a faulted portion of the message, wherein the faulted portion contains all of the faulted and suspicious message elements; and
    e) requesting retransmission of the faulted portion of the message.

11. Non-transitory computer-readable media in a wireless receiver, the media containing instructions that when implemented by a computing environment cause a method to be performed, the method comprising:
    a) receiving or determining a plurality of predetermined amplitude levels of a modulation scheme;
    b) receiving a message comprising message elements, each message element comprising an I-branch signal and a Q-branch signal 90-degree phase-shifted relative to the I-branch signal;
    c) determining, for a particular message element, an I-branch amplitude of the I-branch signal and a Q-branch amplitude of the Q-branch signal;
    d) determining an I-branch deviation comprising a difference between the I-branch amplitude and one of the predetermined amplitude levels of the modulation scheme, and determining a Q-branch deviation comprising a difference between the Q-branch amplitude and one of the predetermined amplitude levels of the modulation scheme; and
    e) determining a modulation quality according to the I-branch deviation and the Q-branch deviation.

12. The media of claim 11, the method further comprising:
    a) receiving one or more demodulation references, each demodulation reference comprising reference elements, each reference element modulated according to one or two of the predetermined amplitude levels of the modulation scheme; and
    b) determining at least one additional amplitude level of the modulation scheme by interpolating between two of the already determined levels of the modulation scheme.

13. The media of claim 11, wherein the modulation quality comprises one of:
    a) an inverse of a sum of magnitudes of the I-branch deviation and the Q-branch deviation;
    b) an inverse of a square root of a sum of squares of the I-branch and Q-branch deviations;
    c) an inverse of a larger of:
        i) a magnitude of the I-branch deviation; and
        ii) a magnitude of the Q-branch deviation;
    d) or a combination of these.

14. The media of claim 11, the method further comprising:
a) determining, for the particular message element, a noise or interference level; and
b) determining the modulation quality of the particular message element by combining, according to a formula, the I-branch deviation, the Q-branch deviation, and the noise or interference level.

15. The media of claim 11, the method further comprising, for each message element:
a) determining a sum-signal comprising the I-branch signal added to the Q-branch signal of the message element;
b) determining a sum-signal amplitude and a sum-signal phase of the message element;
c) determining a sum-signal amplitude deviation comprising a difference between the sum-signal amplitude and a predetermined sum-signal amplitude level of the modulation scheme, and determining a sum-signal phase deviation comprising a difference between the sum-signal phase and a predetermined sum-signal phase level of the modulation scheme; and
d) determining the modulation quality of the message element by combining, according to a formula, the I-branch deviation, the Q-branch deviation, the sum-signal amplitude deviation, and the sum-signal phase deviation.

16. The media of claim 11, the method further comprising:
a) transmitting a request specifying a particular portion of the message, the particular portion including all of the message elements having modulation quality below a predetermined threshold;
b) receiving a retransmitted portion of the message, the retransmitted portion comprising a second copy of the particular portion of the message;
c) replacing the particular portion of the message with the retransmitted portion; and
d) determining whether the message, including the retransmitted portion, agrees with an associated error-detection code.

17. The media of claim 16, the method further comprising:
a) if the message, including the retransmitted portion, disagrees with the associated error-detection code, requesting a retransmission of the entire message.

18. A wireless transmitter configured to:
a) transmit a data message to a receiver;
b) receive a request message from the receiver, the request message specifying a particular portion of the data message; and
c) retransmitting the particular portion of the data message to the receiver.

19. The wireless transmitter of claim 18, wherein:
a) the particular portion comprises one of:
i) a particular half of the data message;
ii) a particular quarter of the data message; or
iii) a particular eighth of the data message; and
b) the request message specifies the particular half, quarter, or eighth of the data message.

20. The wireless transmitter of claim 18, further configured to:
a) include, in the data message, an identification index comprising at most four bits;
b) receive, in the request message, the identification index; and
c) determine, according to the identification index, the data message and a C-RNTI (cell radio network temporary identification) of the receiver.

* * * * *